United States Patent
Martin et al.

(10) Patent No.: US 9,432,633 B2
(45) Date of Patent: Aug. 30, 2016

(54) VISUAL COMMAND PROCESSING

(75) Inventors: Steven D. Martin, Fort Collins, CO (US); Shu Yang, Clovis, CA (US); Greg Millar, Coarsegold, CA (US); Tony T. Di Croce, Fresno, CA (US); Jason A. Heddings, Thornton, CO (US); Casey L. Miller, Fort Collins, CO (US); James W. Owens, Fort Collins, CO (US)

(73) Assignee: PELCO, Inc., Clovis, CA (US)

( * ) Notice: Subject to any disclaimer, the term of this patent is extended or adjusted under 35 U.S.C. 154(b) by 263 days.

(21) Appl. No.: 13/338,826

(22) Filed: Dec. 28, 2011

(65) Prior Publication Data

US 2013/0169801 A1 Jul. 4, 2013

(51) Int. Cl.
| | |
|---|---|
| *H04N 7/18* | (2006.01) |
| *G06T 7/00* | (2006.01) |
| *H04N 5/232* | (2006.01) |
| *H04N 1/00* | (2006.01) |

(52) U.S. Cl.
CPC .......... *H04N 7/181* (2013.01); *G06T 7/0018* (2013.01); *H04N 5/23206* (2013.01); *H04N 5/23219* (2013.01); *G06T 2207/30204* (2013.01); *G06T 2207/30232* (2013.01); *H04N 1/00334* (2013.01)

(58) Field of Classification Search
CPC .......... G06T 2207/30204; G06T 2207/30232; G06T 7/0018; H04N 5/23206; H04N 5/23219; H04N 7/181
USPC .................................. 348/143–161
See application file for complete search history.

(56) References Cited

U.S. PATENT DOCUMENTS

| | | | | |
|---|---|---|---|---|
| 5,977,976 A | * | 11/1999 | Maeda | .......................... 715/841 |
| 2002/0102966 A1 | * | 8/2002 | Lev et al. | ..................... 455/412 |
| 2007/0120996 A1 | | 5/2007 | Boillot | |
| 2010/0110212 A1 | | 5/2010 | Kuwahara et al. | |
| 2010/0295948 A1 | | 11/2010 | Xie et al. | |
| 2011/0037731 A1 | | 2/2011 | Wang et al. | |
| 2013/0141587 A1 | * | 6/2013 | Petricoin, Jr. | ................. 348/156 |

(Continued)

FOREIGN PATENT DOCUMENTS

| | | | | |
|---|---|---|---|---|
| EP | 0804031 A2 | 10/1997 | | |
| JP | 2007004438 A | * | 1/2007 | ............. G06K 19/07 |

(Continued)

OTHER PUBLICATIONS

International Search Report dated Jul. 19, 2013 for International Application No. PCT/US2012/069707, 6 pages.

(Continued)

*Primary Examiner* — Gelek W Topgyal
(74) *Attorney, Agent, or Firm* — Hunter Clark PLLC

(57) ABSTRACT

An example method for processing visual communications at a video camera according to the disclosure includes analyzing video content captured by the video camera to identify a visual command presented to the camera by a user in the field of view of the camera, executing the visual command identified from the video content captured by the video camera, wherein executing the visual command includes setting one or more operating parameters of the video camera, determining a command completion indication corresponding to whether the command was successfully executed, and providing a command completion indication, corresponding to the command completion indication, to the user.

40 Claims, 9 Drawing Sheets

(56) References Cited

U.S. PATENT DOCUMENTS

2013/0155173 A1* 6/2013 Brady .................. H04N 7/15
 348/14.03
2013/0275849 A1* 10/2013 King et al. ................... 715/229

FOREIGN PATENT DOCUMENTS

WO 0169365 A1 9/2001
WO 2008114088 A2 9/2008

OTHER PUBLICATIONS

International Preliminary Report on Patentability dated Jul. 10, 2014 for International Application No. PCT/US2012/069707, 13 pages.
International Search Report and Written Opinion for PCT/US2012/069707, mailed Mar. 26, 2013.

* cited by examiner

VISUAL COMMAND PROCESSING

BACKGROUND

Video surveillance systems are used in home, commercial, and governmental settings to monitor areas for unauthorized activity and/or unauthorized access. For example, banks and casinos typically have video surveillance systems to capture video of activity taking place on premises due to the large amounts of money that are handled at these businesses. Airports, train stations, and ports often employ video surveillance as part of the overall security for such facilities. Many stores and shopping centers also have installed video surveillance systems to monitor the premises for theft and other undesirable activity. Military and government installations often use video surveillance systems to monitor the facilities for unauthorized access. Surveillance systems have also been implemented in some areas to monitor traffic and/or pedestrian activity. Video surveillance systems are also commonly used in industrial settings for monitoring access to facilities and for monitoring industrial processes.

A typical video surveillance system can include hundreds of video cameras deployed throughout a facility. Conventional video surveillance systems can include one or more types of video cameras, including cameras that record the portion of the electromagnetic spectrum referred to as the visible light spectrum, night vision cameras using various techniques to capture images in low light conditions, and thermographic cameras that can be used to capture video in the infrared portion of the electromagnetic spectrum. The sheer number of video cameras can make configuring and calibrating these cameras a difficult and time consuming endeavor.

SUMMARY

An example method for processing visual communications at a video camera according to the disclosure includes analyzing video content captured by the video camera to identify a visual command presented to the camera by a user in the field of view of the camera, executing the visual command identified from the video content captured by the video camera, wherein executing the visual command includes setting one or more operating parameters of the video camera, determining a command completion indication corresponding to whether the command was successfully executed, and providing a command completion indication, corresponding to the command completion indication, to the user.

Implementations of such a method may include one or more of the following features. Detecting authentication credentials in the video content captured by the video camera, and determining that a user is authorized to send command information to the video camera based on the authentication credentials detected. Providing the command completion indication to the user includes sending an email message to the user. Providing the command completion indication to the user includes sending a text message to the user. Providing the command completion indication to the user includes illuminating one or more indicator lights on the video camera in a predetermined pattern. Analyzing the video content includes interpreting a barcode. Analyzing the video content includes interpreting a two-dimensional data matrix. Analyzing the video content includes interpreting a color pattern. Analyzing the video content includes interpreting icons. Executing the visual command identified in the video content captured by the video camera includes transmitting the video content captured by the video camera to a mobile device associated with the user.

An example video camera configured to receive and process visual commands according to the disclosure includes means for analyzing video content captured by the video camera to identify a visual command presented to the camera by a user in the field of view of the camera, means for executing the visual command identified from the video content captured by the video camera, wherein executing the visual command includes setting one or more operating parameters of the video camera; means for determining a command completion indication corresponding to whether the command was successfully executed; and means for providing a command completion indication, corresponding to the command completion indication, to the user.

Implementations of such a video camera may include one or more of the following features. Means for detecting authentication credentials in video content captured by the video camera, and means for determining that a user is authorized to send command information to the video camera based on the authentication credential detected. The means for providing the command completion indication to the user includes means for sending an email message to the user that includes the command completion indication. The means for providing the command completion indication to the user includes means for sending a text message to the user that includes the command completion indication. The means for providing the command completion indication to the user includes means for illuminating one or more indicator lights on the video camera in a predetermined pattern. The means for analyzing the video content includes means for interpreting a barcode. The means for analyzing the video content includes means for interpreting a two-dimensional data matrix. The means for analyzing the video content includes means for interpreting a color pattern. The means for analyzing the video content includes means for interpreting icons. The means for executing the visual command identified in the video content captured by the video camera includes means for transmitting the video content captured by the video camera to a mobile device associated with the user.

An example tangible computer-readable medium, having stored thereon computer-readable instructions for processing visual commands received at the video camera, according to the disclosure includes instructions configured to cause the computer to analyze video content captured by the video camera to identify a visual command presented to the camera by a user in the field of view of the camera, execute the visual command identified in the video content captured by the video camera, wherein executing the visual command includes setting one or more operating parameters of the video camera in response to identifying the visual command, generate a command completion indication that indicates whether the command was successfully executed, and provide the command completely status to the user.

Implementations of such a medium may include one or more of the following features. Instructions configured to cause a computer to detect authentication credentials in video content captured by the video camera, and determine that a user is authorized to send command information to the video camera based on the authentication credential detected. The instructions that cause the computer to provide the command completion indication to the user include instructions that cause the computer to send an email message to the user that includes the command completion indication. The instructions that cause the computer to provide the command completion indication to the user include the instructions that cause the computer to send a text message to the user that includes the command completion indication. The instructions that cause the computer to provide the command completion indication to the user includes the instructions that cause the computer to illuminate one or more indicator lights on the video camera in a predetermined pattern. The instructions that cause the computer to analyze the video content include instructions that cause the computer to interpret a barcode. The instructions that cause the computer to analyze the video content include instructions that cause the computer to interpret a two-dimensional data matrix. The instructions that cause the computer to analyze the video content include instructions that cause the computer to interpret a color pattern. The instructions that cause the computer to analyze the video content include instructions that cause the computer to interpret icons. The instructions that cause the computer to execute the visual command identified in the video content captured by the video camera further comprises instructions to cause the computer to transmit the video content captured by the video camera to a mobile device associated with the user.

An example video camera configured to receive and process visual commands according to the disclosure includes an imaging sensor configured to output sensor data of view a field of view of the view camera, and a processor configured to execute program instructions to process video data output by the imaging sensor to: analyze the video content captured by the imaging sensor to identify a visual command presented to the camera by a user in the field of view of the camera, execute the visual command identified from the video content captured by the video camera, wherein executing the visual command includes setting one or more operating parameters of the video camera, determining a command completion indication corresponding to whether the command was successfully executed, and provide a command completion indication, corresponding to the command completion indication, to the user.

Implementations of such a video camera may include one or more of the following features. An authentication module configured to detect authentication credentials in video content captured by the video camera, and determine that a user is authorized to send command information to the video camera based on the authentication credential detected. The processor is configured to sending an email message to the user that includes the command completion indication. The processor is configured to send a text message to the user that includes the command completion indication. The processor is configured to illuminate one or more indicator lights on the video camera in a predetermined pattern. The command processing module is configured to interpret commands encoded using a barcode. The processor is configured to interpret commands encoded using a multi-dimensional data matrix. The processor is configured to interpret commands encoded using a color encoding technique. The processor is configured to interpret commands encoded using icons. The processor is configured to transmit the video content captured by the video camera to a mobile device associated with the user in response to executing the visual command.

An example method for mapping the location of video cameras in a surveillance system according to the disclosure includes displaying a map of a facility being monitored by the surveillance system on a mobile device, receiving a user input indicating the location of a user-selected camera in the facility, generating a camera identification code for the camera using the mobile device, encoding a camera identification command, the camera identification command including the camera identification code and location information associated with the location of the camera received from the user, displaying a visible indication corresponding to the camera identification command on a display of the mobile device, and determining whether a communication is received from the surveillance system corresponding to the encoded camera identification command.

Implementations of such a method may include one or more of the following features. Encoding a camera identification command includes encoding the camera identification command in a barcode. Encoding a camera identification command includes encoding the camera identification command in a two-dimensional data matrix. Encoding a camera identification command includes encoding the camera identification command as a color pattern. Encoding a camera identification command includes encoding the camera identification command as icons.

An example mobile device for mapping the location of video cameras in a surveillance system according to the disclosure includes means for displaying a map of a facility being monitored by the surveillance system on a mobile device, means for receiving a user input indicating the location of a user-selected camera in the facility, means for generating a camera identification code for the camera using the mobile device, means for encoding a camera identification command, the camera identification command including the camera identification code and location information associated with the location of the camera received from the user, means for displaying a visible indication corresponding to the camera identification command on a display of the mobile device, and means for determining whether a communication is received from the surveillance system corresponding to the encoded camera identification command.

Implementations of such a mobile device may include one or more of the following features. The means for encoding the camera identification command includes means for encoding the camera identification command in a barcode. The means for encoding the camera identification command includes means for encoding the camera identification command in a two-dimensional data matrix. The means for encoding the camera identification command includes means for encoding the camera identification command in a color pattern. The means for encoding the camera identification command includes means for encoding the camera identification command in icons.

An example tangible computer-readable medium, having stored thereon computer-readable instructions for mapping the location of video cameras in a surveillance system, according to the disclosure includes instructions configured to cause a computer to display a map of a facility being monitored by the surveillance system on a mobile device, receive a user input indicating the location of a user-selected camera in the facility, generate a camera identification code for the camera using the mobile device, encode a camera identification command, the camera identification command including the camera identification code and location information associated with the location of the camera received from the user, display a visible indication corresponding to the camera identification command on a display of the mobile device; and determine whether a communication is received from the surveillance system corresponding to the encoded camera identification command.

Implementations of such a medium may include one or more of the following features. The instructions that cause the computer to encode the camera identification command includes instructions that cause the computer to encode the camera identification command in a barcode. The instructions that cause the computer to encode the camera identification command includes instructions that cause the computer to encode the camera identification command in a two-dimensional data matrix. The instructions that cause the computer to encode the camera identification command includes instructions that cause the computer to encode the camera identification command in a color pattern. The instructions that cause the computer to encode the camera identification command includes instructions that cause the computer to encode the camera identification command in icons.

An example method for calibrating a video camera according to the disclosure includes receiving video content of a scene being monitored by the video camera, identifying a first object in the video content, analyzing the first object to determine that the first object represents a calibration command to the video camera, adding the first object to a calibration location list, calculating a calibration matrix for the video camera based on the calibration location list, and converting image coordinates in video content received from the video camera to geographical coordinates using the calibration matrix. Analyzing the first object includes determining that a color of the first object corresponds to a trigger color associated with the calibration command, and determining that a shape of the first object corresponds to a trigger gesture associated with the calibration command.

Implementations of such a method may include one or more of the following features. Providing an acknowledgment to the user responsive to determining that the first object is the user. Providing the acknowledgement to the user includes sending an email message to the user. Providing the acknowledgement to the user includes sending a text message to the user. Providing the acknowledgement to the user includes illuminating one or more indicator lights on the video camera in a predetermined pattern.

An example apparatus for calibrating a video camera according to the disclosure includes means for receiving video content of a scene being monitored by the video camera, means for identifying a first object in the video content, means for analyzing the first object to determine that the first object represents a calibration command to the video camera, means for adding the first object to a calibration location list, means for calculating a calibration matrix for the video camera based on the calibration location list, and means for converting image coordinates in video content received from the video camera to geographical coordinates using the calibration matrix. The means for analyzing the first object includes: means for determining that a color of the first object corresponds to a trigger color associated with the calibration command, and means for determining that a shape of the first object corresponds to a trigger gesture associated with the calibration command.

Implementations of such an apparatus may include one or more of the following features. Means for providing an acknowledgment to the user responsive to determining that the first object is the user. The means for providing the acknowledgement to the user includes means for sending an email message to the user. The means for providing the acknowledgement to the user includes means for sending a text message to the user. The means for providing the acknowledgement to the user includes means for illuminating one or more indicator lights on the video camera in a predetermined pattern.

An example tangible computer-readable medium, having stored thereon computer-readable instructions calibrating a video camera, according to the disclosure includes instructions configured to cause a computer to receive video content of a scene being monitored by the video camera, identify a first object in the video content, analyze the first object to determine that the first object represents a calibration command to the video camera, adding the first object to a calibration location list, calculating a calibration matrix for the video camera based on the calibration location list, and calculate calibration matrix for the video camera based on the calibration location list, and convert image coordinates in video content received from the video camera to geographical coordinates using the calibration matrix.

The instructions to cause the computer to analyze the first object includes instructions configured to cause the computer to determine that a color of the first object corresponds to a trigger color associated with the calibration command, and determining that a shape of the first object corresponds to a trigger gesture associated with the calibration command. Instructions configured to cause the computer to provide an acknowledgment to the user responsive to determining that an object identified in the video content is the user. The instructions to provide the acknowledgement to the user include instructions configured to cause the computer to send an email message to the user. The instructions to provide the acknowledgement to the user include instructions configured to cause the computer to send a text message to the user. The instructions to provide the acknowledgement to the user include instructions configured to cause the computer to illuminate one or more indicator lights on the video camera in a predetermined pattern.

DETAILED DESCRIPTION

Figure 1:
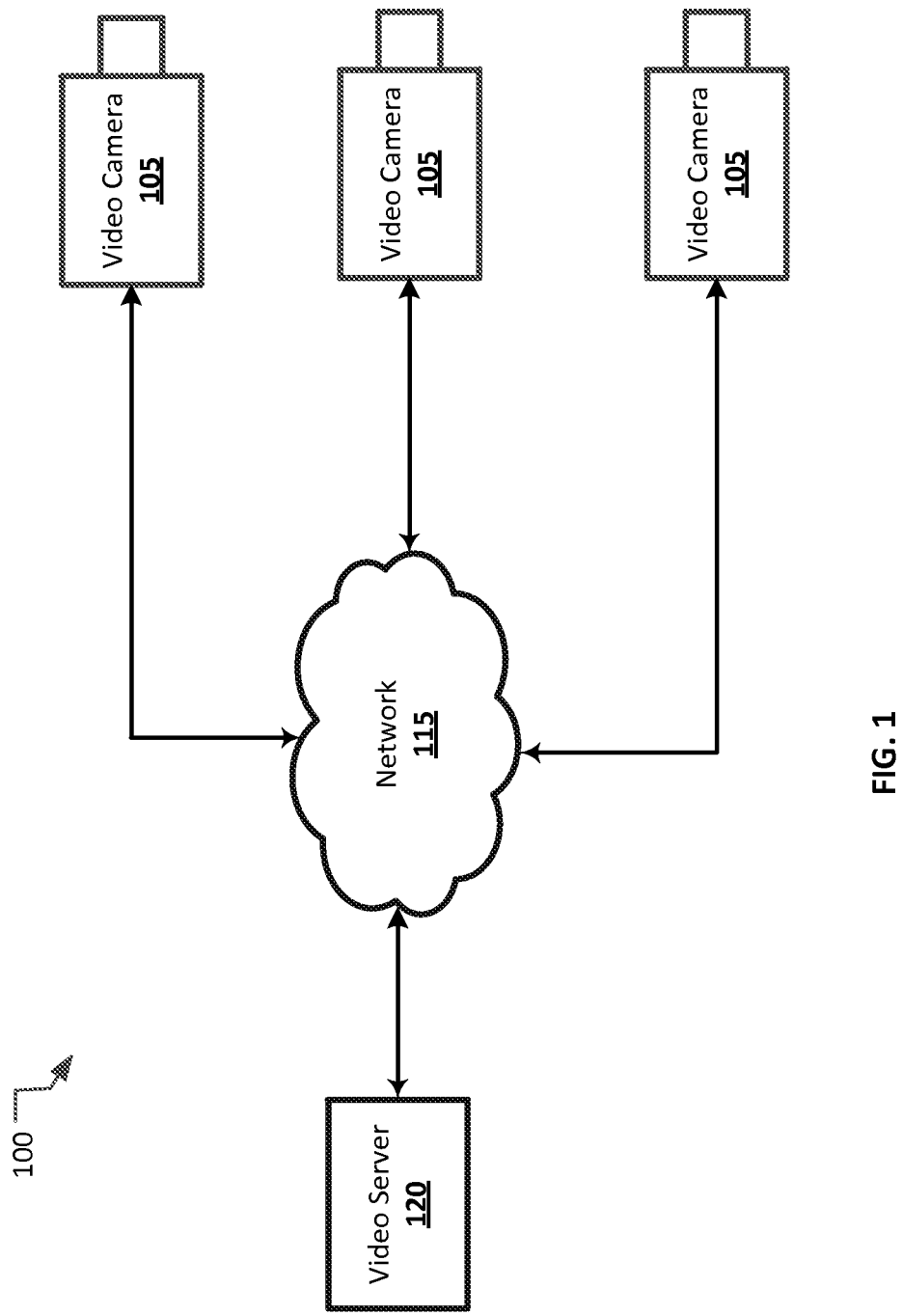
FIG. 1 is block diagram of a video surveillance system.

Techniques for visually communicating with an image capture device and implementing actions according to received communications are provided. For example, techniques can be employed in video surveillance systems to configure video capture devices by using visual commands presented to the image capture devices to setup and calibrate the image capture devices, to retrieve information and/or video content from the image capture devices, or to instruct the image capture devices to perform other actions. Techniques disclosed herein can provide a user, such as an installer, a system integrator, or technician with an interface for negotiating an ad-hoc network connection with video cameras and other image capture devices in a surveillance system.

In at least some implementations of the disclosure, a user can calibrate or change the settings of either networked or non-networked imaging devices. For example, the user can communicate with either a stand-alone video camera or a network-enabled video camera using visual commands to interact with the device. The user can also use visual commands to communicate with a video camera or other imaging device to retrieve information about the device. For example, the user can signal the device to transmit network address or other information about the device to the user. The visual commands can include command parameters that indicate what information has been requested from the camera and how the user would like to receive the information. The video camera can be configured to transmit the requested information using various techniques. The camera can be configured to transmit the information to the user through one or more intermediary servers. For example, the video camera can be configured to send an email to an email address specified by the user or to send a text message to a mobile device, such as a smart phone or table computer. The video camera can be configured to generate an email or text message by interfacing with an external email server or text messaging server. The visual command can also instruct the video camera to stream the video content captured by the camera to a mobile device of the user.

In at least some implementations of the disclosure, a user can cause a video camera to generate a signal to trigger an alarm or relay connected to the camera. For example, the video camera can trigger a relay connected to the camera to perform some action, such as closing a security door. A user can use this technique, for example, to test integration of components of a surveillance system and/or to activate the surveillance system to perform some response to an event in the facility. A user can also present visual commands to a video camera that can convey information to operators of the surveillance system. For example, a user in a facility being monitored that identifies a broken or malfunctioning piece of equipment could present a visual command to the camera that identifies the broken or malfunctioning equipment and the camera can transmit a message to an operator to take corrective action.

The following description illustrates three examples of how the visual communications techniques disclosed herein can be used in a surveillance system: (1) setup and configuration of new devices, (2) maintenance and configuration of existing imaging devices, and (3) analytics calibration of imaging devices.

Setup and configuration of new devices in a video surveillance system can be quite challenging. In some systems, hundreds of imaging devices can be deployed throughout a facility. The video cameras or other imaging devices are often network-enabled and can transmit video content captured by the imaging devices across a network to a server configured to display, store and/or analyze the captured video content. The video cameras are often dispersed throughout the facility being monitored.

A technician will typically install a video camera at a desired location and then attempt to negotiate the network on which the device has been installed in an attempt to locate and connect to the video camera. In facilities where there are a large number of imaging devices, identifying which device is the newly added device among the vast number of imaging devices can be difficult. Negotiating the local network can be problematic and the technician often is unable locate and connect to the newly added video camera without substantial manual effort to locate the video camera on the network. The visual communication and command techniques disclosed herein can be used to setup and configure new devices without requiring the technician to having advance knowledge of the network or the network address of the camera being configured. The technician can present visual commands to the camera to retrieve the network address of the camera and/or other configuration information from the video camera and to test and configure the camera.

Periodic maintenance and configuration of a surveillance system can also be challenging in conventional surveillance systems. Determining the network address or other information for a particular imaging device in a large number of imaging devices can be quite difficult. A system can include hundreds of cameras and/or other imaging devices on a single network, and it can be difficult to determine what the network address and/or other information is for the imaging devices that have already been installed. The visual communication and command techniques disclosed herein can be used to maintain and configure existing cameras that are already part of the surveillance system by allowing the technician to retrieve information and video data from the video camera and to present visual commands to the camera to calibrate and configure the camera.

Analytics calibration of the imaging devices can also be challenging. Calibration of the imaging devices in conventional systems often requires a great deal of training on the part of the technician performing the calibration. Often the technician must resort to trial and error when calibrating the imaging device in an attempt to achieve desired results. The visual techniques disclosed herein can be used to calibrate imaging devices without the technician having access the camera through a network, and can provide a set of predetermined calibration commands that the technician can present to an imaging device to test various calibration settings. These settings can be selected to improve the performance of the imaging devices in various environmental conditions and/or selected to improve the performance of hardware specific to the imaging device. The imaging device can be configured to recognize visual calibration commands and to present the technician with sample still images or video content captured by the camera using the sample calibration images. The video camera can be configured to recognize gestures of a user positioned in the field of view of the camera and to translate those gestures into commands that can be executed by the video camera.

FIG. 1 is block diagram of a video surveillance system 100 that can be used to implement techniques disclosed herein. The video surveillance system 100 includes multiple video cameras 105. The video cameras 105 can be configured to capture video images of an area to be monitored and transmit the captured video content to a video server 120 via a network 115. The network 115 can comprise one or more local area networks (LANs), wide area networks (WANs), or a combination thereof. The network 115 can be the Internet.

The video surveillance system 100 can include image sensors configured to detect electromagnetic radiation within the visible light spectrum, thermographic cameras that include sensors configured to detect infrared radiation, cameras configured to operate in low light conditions, or a combination thereof. The video cameras 105 can be configured to perform some processing and/or video analytics on the video content captured by the image sensors of the video cameras 105.

The video server 120 can be configured to receive the video content transmitted by the video cameras 105 via the network 115. The video server 120 can be configured to display at least a portion of the incoming video content on one or more display devices. The video server 120 can also be configured to store the video content received from the video cameras 105 in an archive. The archive can be searchable based on various criteria, such as by which camera captured the video content and/or by date and/or time that the video content was captured. The video server 120 can be configured to apply one or more coding and analytic algorithms to the video content received from the video cameras 105 to identify the presence of suspicious objects or motions within the environment being monitored by the video cameras 105.

Figure 2:
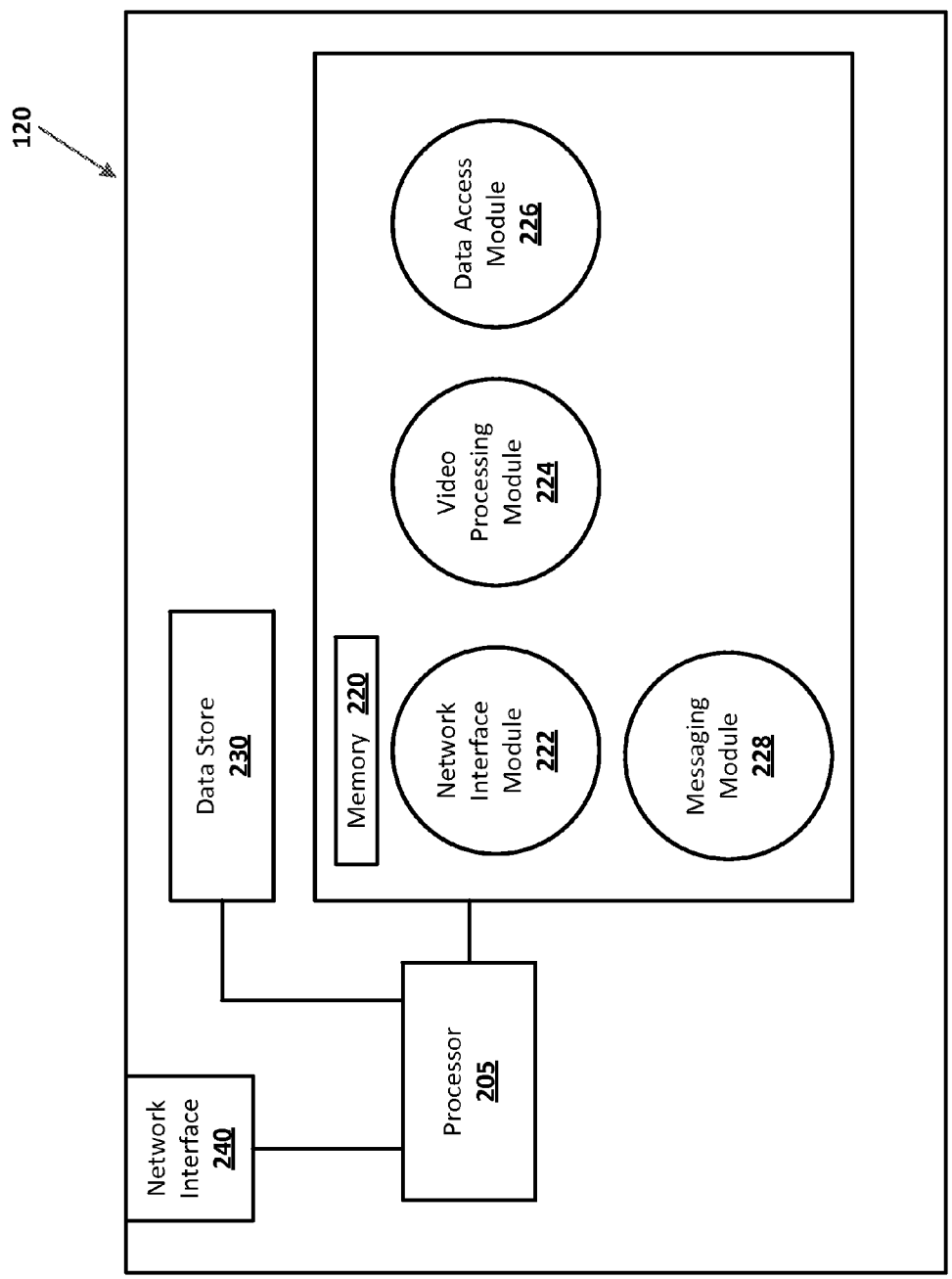
FIG. 2 is a block diagram of a video server illustrated in FIG. 1.

FIG. 2 is a block diagram of an example of the video server 120 illustrated in FIG. 1. In this example, the video server 120 includes a processor 205, a memory 220, a data store 230, and a network interface 240. The memory 220 includes a network interface module 222, a video processing module 224, a data access module 226, and a messaging module 228. The memory 220 can comprise one or more types of tangible, non-transitory computer-readable memory, such as random-access memory (RAM), read-only memory (ROM), flash memory, or a combination thereof. The modules 222, 224, 226 can comprise processor-readable instructions configured to cause the processor 205 to perform actions discussed herein. The processor-readable instructions may be processor-executable directly, or after being compiled.

The processor 205 can comprise one or more microprocessors configured to access the memory 220. The processor 205 can read data from and write data to the memory 220. The processor 205 can also read executable program code from the memory 220 and execute the program code.

The data store 230 can comprise a tangible, non-transitory memory that can be used to store video content received from the video cameras 105. The data store 230 can be implemented in the memory 220 or in a separate tangible, non-transitory memory. In some implementations, the data store 230 can be implemented as a searchable database in which the video content captured by the video cameras 105 can be archived. The data store 230 can also be used to store video that has been processed by the video processing module 224.

The network interface module 222 is configured to receive data from the network 115 via the network interface 240. The network interface module 222 can also be configured to transmit information to the video camera 105 or other network-connected devices via the network 140.

The video processing module 224 can be configured to process video content received from the video camera 105. The video processing module 224 can apply one or more video analytics algorithms to the video content received from the video cameras 105. For example, the video processing module 224 can execute one or more analytics algorithms that can be used to identify events in the video content, such as the presence of a person or animal in an area under surveillance or the arrival of a vehicle within the area under surveillance. The video processing module 224 can also be configured to generate a background model of the scene being monitored by the video camera 105. The background model of the scene can be used by video processing module 224 to distinguish between background and foreground objects in the video content received from the video camera. The video processing module 224 can be configured to construct the background model by analyzing video content captured by the video camera 105 during an initialization period to identify the objects that comprise the background of the scene. The video processing module 224 can be configured to periodically update the model of the background. Updating the background allows the analytics algorithms to adjust for changing lighting conditions (e.g., day vs. night) or changing weather conditions (e.g. a cloudy vs. a sunny day), which could otherwise cause false identification of objects.

The data access module 226 can be configured to access data stored in the data store 230 and write data to the data store 230. The data access module 226 can be configured to read and/or write data to the memory 220. The data store 230 can be used to store stored images and background models derived by the video processing module 224 from data received from the video cameras 105.

The messaging module 228 can be configured to transmit email, text messages, and/or voice messages to a user. The messaging module 228 can be configured to interface with an email server or text messaging server to transmit an email message or a text message to a user. For example, the messaging module 228 can be configured to send a text message or an email message to a user to provide the completion status of a command to the user. The messaging module 228 can be configured to receive requests to send an email message to a user from the video camera 105 and to send the requested email message or text message in response to receiving the request.

Figure 3:
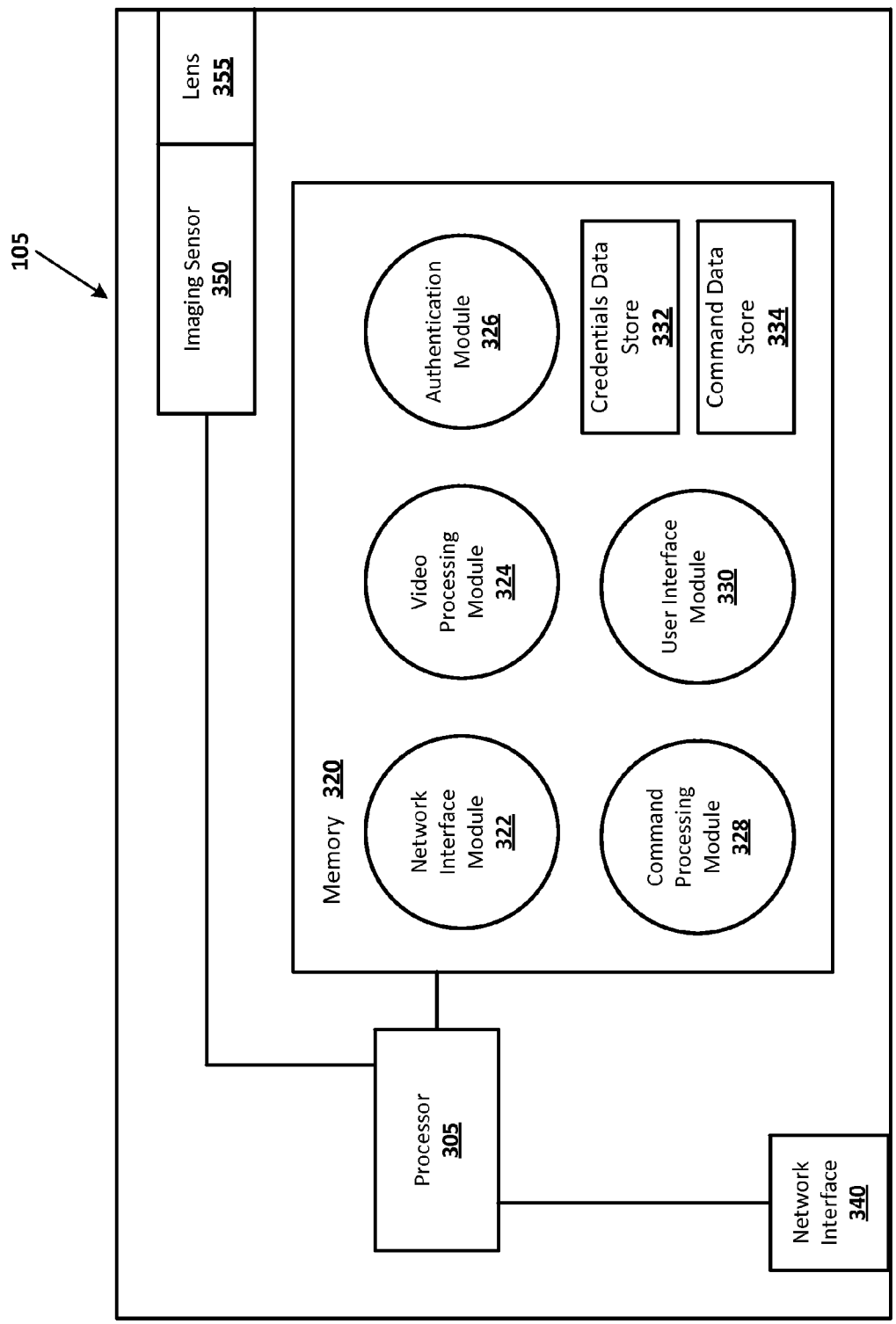
FIG. 3 is a block diagram of a video camera illustrated in FIG. 1.

FIG. 3 is a block diagram of an example of the video cameras 105 illustrated in FIG. 1. The video camera 105 includes a processor 305, a memory 320, an image sensor 350, a lens 355, and a network interface 340. The memory 320 includes a network interface module 322, an image processing module 324, an authentication module 326, and a command processing module 328. The memory 320 can comprise one or more types of tangible, non-transitory computer-readable memory, such as random-access memory (RAM), read-only memory (ROM), flash memory, or a combination thereof. The modules can comprise processor-executable instructions that can be executed by processor 305.

The lens 355 is configured to capture light received from a scene being monitored by the video camera 105 and to focus the received light on the imaging sensor 350. The lens can also be configured to capture electromagnetic wavelengths outside of the portion of the electromagnetic spectrum that is visible to the human eye. For example, the lens can also be configured to focus infrared radiation on the imaging sensor 350. Imaging sensor 350 is configured to detect electromagnetic radiation and to output a signal that can be processed by the video processing module before being transmitted to the video server 120.

The imaging sensor 350 can be configured to detect various wavelengths of electromagnetic radiation and to output a sensor data representing the electromagnetic radiation detected by the sensor 350. The imaging sensor 350 can comprise a charge-coupled device (CCD) or a CMOS active pixel sensor (APS) comprising an array of pixel sensors where each pixel includes a photodetector and an active amplifier. The imaging sensor 350 can comprise a thermal imaging sensor configured to detect infrared radiation within the infrared range of the electromagnetic spectrum. The infrared range includes wavelength approximately within the 9000 to 14,000 nanometers range. Various types of thermal imaging sensors 330 can be used in the video camera 105, such as indium antimonide (InSb), iridium gallium arsenide (InGaAs), mercury cadmium telluride (CMT), or quantum well infrared photodetector (QWIP) focal plane arrays (FPAs) that respond to mid-wavelength and/or long-wavelength infrared radiation.

The processor 305 can comprise one or more microprocessors configured to access memory 320. The processor 305 can read data from and write data to memory 320. The processor 305 can also read executable program code from memory 320 and execute the program code.

The network interface module 322 is configured to receive data from the network 115 via network interface 340. The network interface module 322 can also be configured to transmit information to the video server 120 or other network-connected devices via network 140.

The video processing module 324 is configured to process sensor data received from the imaging sensor 350 to create video content that represents the scene being monitored by the video camera 105. The video processing module can also provide the video content to the network interface module 322. The network interface module 322 can also transmit the video content to the video server 120 via the network interface 340. The video processing module 324 can also provide the video content to the command processing module 328.

The command processing module 328 can be configured to identify visual commands issued by a user to the video camera 105. The visual commands can in some instances be visible to the human eye and in other instances can be invisible to the human eye but visible to the imaging sensor 350 of the video camera 105. The visual commands can be used to instruct the video camera to perform some action, such as providing a network address or other identifier to a user or to calibrate the camera. The command processing module 328 can also be configured to send command information to the video server 120 for analysis and processing, and the video server 120 can be configured to send command information to the video camera 105 to be executed by the video camera 105.

The visual commands can be presented to the video camera 105 in various ways. For example, a user can hold a command card in front of the camera that includes command information printed, drawn, or written on the command card. The command information can include machine-readable and/or human readable representation of one or more camera-recognized commands that instruct the video camera 105 to perform some action or actions. The command information can also include data and/or calibration parameters for the video camera 105, and/or test parameters for testing the calibration of the video camera.

The command information can also include authentication credentials that can be used to determine whether the user is authorized to instruct the camera 105 to perform commands. The authentication credentials can be tailored to each user. For example, some users may have authentication credentials that allow them to instruct the camera to perform only a subset of the commands recognized by the camera while other user may have authentication credentials that allow them to instruct the camera to perform a different set of commands.

The command information can be printed or handwritten text or can be encoded in a barcode, a Quick Response (QR) code, or other type of data matrix or barcode that can be used to encode information into a machine-readable format. The command information can also be encoded using serial data color patterns or matrices of color values. One such encoding scheme is known as High Capacity Color Barcode (HCCB) specification developed by Microsoft Corporation. Other types of optically readable encoding schemes can also be used.

While described as being a "card" the command card need not be printed on a card. Rather, the command card can be any sort of physical media on which the command information can be displayed. The physical media can be placed in the view of the camera 105 where the imaging sensor 350 can capture video content that includes a represent of the command information.

The command information can also be displayed on a display device of a mobile device, such as a mobile phone, a tablet computer, a laptop computer system, or other such device having a processor that can execute processor-executable instructions stored in a tangible, computer-readable memory. The display of the device can be configured to display the command information in any of the various formats described above with respect to presenting the command information on physical media.

The video camera 105 can also be configured to allow the user to communicate with the video camera using an infrared interface. For example, the imaging sensor 350 can be configured to detect command information transmitted as infrared signals transmitted by an infrared-enabled device. The device can be a dedicated device configured to communicate with the video camera 105. For example, the dedicated device could comprise a hand-held device that is preprogrammed with a set of command information that can be used to communicate with the device. The device can also be configured to accept user inputs, such as authentication credentials, calibration settings, or other data, and to encode the command information into infrared signals that can be decoded and processed by the video camera 105.

The infrared-enabled device can be a programmable device that includes an infrared port that can send infrared signals to the video camera 105 that can be detected by the imaging sensor 350 and the command processing module 328 can analyze the signals to determine whether the signals include command information. The video camera 105 can also include an infrared sensor (not shown) that is separate from the imaging sensor 350 that can be used to detect infrared signals from the infrared-enabled device. The infrared-enabled device can comprise a handheld computer, a wireless mobile device, mobile phone, a tablet computer, a laptop computer system, or other device having a processor that can execute processor-executable instructions stored in a tangible, computer-readable memory.

The command processing module 328 can be configured to perform geometric correction on the sensor data received from the imaging processed in order to correct for distortions introduced in the command information caused by the position of the camera and the display of the device, card stock, or other material on which the command information relative to the camera. The video camera 105 can be configured to recognize command information positioned within a specific range from the lens of the video camera 105 and to ignore objects position outside of the specific range in to reduce errors in identifying the command information content.

The commands data store 334 can be configured to store a set of commands that the camera is authorized to perform. The commands data store 334 can be stored in the memory 320. Alternatively or in addition to the being stored in the memory 320, the commands data store 320 can be stored in a separate tangible, computer-readable medium (not shown) of the video camera 105.

The authentication module 326 can be configured to authenticate a user before accepting commands from that user. In one example, the user can present the camera with authentication credentials that can be verified by the authentication module 326. In an example, the user can present command information the camera 105 that includes authentication credentials that can be identified by the command processing module 328, and the command processing module 328 can provide the authentication credentials to the authentication module 326 for verification. In an example, if the user presents the video camera with authentication credentials that include full administrator access, the video camera 105 can be configured to respond to all user commands for at least a predetermined period of time.

In another example, if the user presents the video camera 105 with authentication credentials that provide limited access to the camera controls, the video camera 105 can be configured to only respond to commands that are associated with the authentication credentials that were presented to the video camera 105 and to ignore other commands presented to the video camera 105. For example, a first user may have authentication credentials that allow the user to submit commands to that request information from the camera, such as the network address of the video camera 105, while a second user may have authentication credentials that allow the video camera 105 to accept analytics calibration commands from the second user that the video camera 105 would not have accepted from the first user.

The authentication module 326 can also be configured to send the authentication credentials to server 120 for authentication rather than the authentication steps described above being performed by the video camera 105.

The authentication module 326 can access credential information stored in the credential data store 332. The credential information can be stored in the camera at the time that the camera is manufactured, can be updated at the time that the camera is installed at a facility, and/or updated after the camera has been installed at the facility. Each video camera 105 can be assigned a unique set of credentials or can be configured to include a set of credential for the particular facility in which the camera is installed.

The user interface module 330 can be configured to provide feedback and/or other information to a user interacting with the video camera 105. The user interface module can be configured to transmit information to a user in response to command received from the user. The user interface module 330 can be configured to transmit a text message or an email message to the user device. In an example, the user can present command information to the camera on the screen of the user's mobile phone, tablet computer, or laptop computer. The user's device can include an application that allows the user to select a command to be encoded in a barcode, QR code, or one of the other camera-recognized formats described above. The request for information can include a destination address at which the user would like to receive the requested information from the video camera 105. The user interface module 330 can be configured to send a request to the messaging module to send an email message or text message on behalf of the camera. The user interface module 330 can also be configured to interface with an external email server or text messaging server via the network 115.

In an example, the command information can include an email address provided by the user or a phone number to which the user would like to have a text message sent containing the requested information sent. The user interface module 330 can be configured to generate a message including the requested information to the video server 120, which can then interface with one or more intermediary servers that can route the message on to the user. For example, the video server 120 can include an email server that can generate an email message that includes the information requested from the video camera 105 by the user. The video server 120 can also implement a text messaging service that can generate a text message that can be routed to the user's mobile service provider for delivery to the user's mobile device or the video server 120 can interface with a third party messaging server 120 to generate and route a text message to the user's mobile device.

In another example, a user can present command information to the camera that includes a command requesting information from the camera, such as a network address of the camera. In a particularly large facility where there are a large number of cameras deployed throughout the facility, the request for information command can be particularly useful for quickly determining the network address or other information about the video camera 105 that the user can use when maintaining or configuring the camera 105. In another example, the user can present command information to the camera that causes the camera to trigger or test other components of a surveillance system. For example, the user can present a command to the video camera 105 to cause the camera to generate a signal to trigger an audible or silent alarm or to cause a security door to close.

The video camera 105 can include one or more indicator lights, such as light emitting diodes (LEDs), organic LED (OLED), or light emitting elements can be illuminated by the user interface module 330 to provide feedback to the user. For example, the video camera 105 can illuminate one or more indicator lights in response to a user command to indicate to the user that the camera has recognized command information that the user has presented to the video camera. The user interface module 330 can be configured to illuminate the one or more indicator lights using different illumination patterns and/or colors to indicate different responses to a user command. For example, the user interface module 330 can be configured to illuminate a red indicator light on the video camera 105 in a solid illumination pattern if the user presents authentication credentials to the camera 105 that are not accepted by the authentication module. In another example, the user interface module 330 can be configured to illuminate an indicator within a blinking illumination pattern if the user presents an unrecognized command to the video camera 105 and configured to illuminate the at least one indicator with a second pattern if the command is recognized by the command processing module 328 but the user is not authorized to issue that command.

The command completion indication can be generated by the command processing module 328 of the video camera 105. The user interface module 330 can be configured to provide the command completion information to user. For example, the user interface module 330 can illuminate one or more indicator lights on the camera or send a text or email message to the user indicating that the command issued by the user has been executed as requested. Similarly, if the command processing module 328 has failed to execute a command for any reason, the user interface module 330 can notify the user that the command has not been executed using any of the communication techniques described above. For example, the user interface module 330 can illuminate one or more indicator lights on the camera or send a text or email message to the user indicating that the command issued by the user has been executed as requested.

Figure 4:
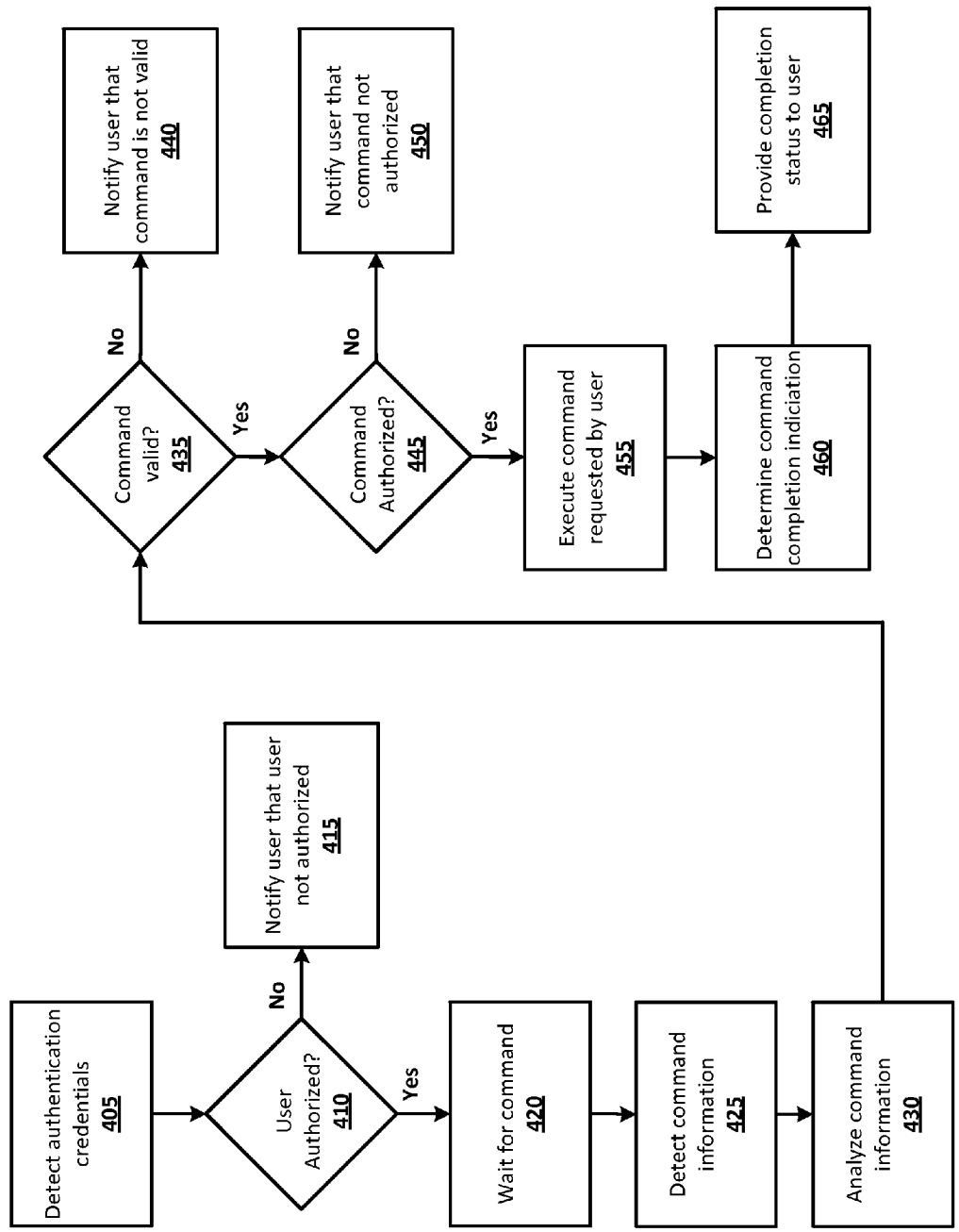
FIG. 4 is a flow diagram of a method for receiving and processing visual commands at a video camera.

FIG. 4 is a flow diagram of a method for receiving and processing visual commands at a video camera. The method illustrated in FIG. 4 can be implemented using the systems illustrated in FIGS. 1-3.

The video camera 105 detects authentication credentials in visual commands presented to the video camera 105 (stage 405). The video camera 105 can be configured to authenticate a user before executing any visual commands presented to the video camera 105 by the user. As described above, the video processing module 324 of the video camera 105 can be configured to process sensor data received from the imaging sensor 350. The video processing module 324 can generate video content from the sensor data and provide the generated video content to the command processing module 328. The command processing module 328 can be configured to identify authentication credentials presented by the user in the video content output by the video content module 324 and/or from an additional sensors included in the video camera 105, and provide the authentication credentials received from the user to the authentication module 326 for verification.

In some implementations, a user can position an object having authentication credentials printed, written, or drawn thereon in the field of view of the camera. The authentication credentials can also be displayed on a display of a portable electronic device, such as a mobile phone, a tablet or laptop computer, a personal digital assistant, or other electronic device capable displaying content on the display screen. The user can position the display of the device in the field of the view of the video camera 105 oriented so that the display faces the lens 350.

The video camera 105 can include an infrared port or other sensor that is separate from the imaging sensor 350 that can be used to detect authentication credentials from a user. The video camera 105 can also be configured to allow the user to communicate with the video camera 105 using infrared or other electromagnetic frequencies outside of the portion of the electromagnetic spectrum that is typically visible to humans. Authentication credentials that are transmitted to the video camera 105 using a portion of the electromagnetic spectrum that is outside of the portion of the spectrum that is visible to humans are still referred to herein as "visual" information even though they may be outside of the portion of the electromagnetic spectrum that is normally visible to the human eye.

A determination is made whether the user is authorized to instruct the camera to perform commands (stage 410). The authentication module 326 can compare the authentication credentials received from the user with authentication credential information stored in the credentials data store 332. In some implementations, the authentication module 326 can send the authentication credentials to the video server 120 for authentication.

If the user was not authorized, the authentication module 326 can notify the user that the user is not authorized to perform commands (stage 415). The authentication module 326 can instruct the user interface module 330 to notify the user invalid authorization credentials were received. The user interface module can notify the user through various techniques. For example, if the camera includes one or more indicator lights, the user interface module 330 can illuminate the one or more indicator lights in a particular color and/or illumination pattern to indicate that the authentication credentials received by the video camera 105 were not valid. The user may simply need to present the command information to the video camera 105 again by repositioning the command information within the camera's field of view. In some implementations, the authentication credentials may have included contact information for the user, such as a mobile number and/or an email address or the user that can be used notify the user that the user is not authorized to instruct the camera to perform operations. The user interface module 330 can generate a text message or an email message to notify the user. The user interface module 330 can be configured to generate the text and email messages through one or more intermediate servers that can be accessed via the network 115 via network interface 340.

If the user was authorized to submit commands to the video camera 105, the video camera 105 can wait for the user to present a command to the video camera 105 (stage 420). The user interface module 330 of the video camera 105 can be configured to notify the user that the camera has entered to a command-receptive mode. The user interface module 330 can be configured to the various communication techniques described above, such as sending an email or text message, illuminating one or more indicator lights on the camera device in a particular color and/or illumination pattern.

The video camera 105 detects command information in the video content captured by the camera (stage 420). As described above, the video processing module 324 of the video camera 105 can be configured to process sensor data received from the imaging sensor 350. The video processing module 324 can generate video content from the sensor data and provide the generated video content to the command processing module 328.

The video camera 105 can be configured to recognize command information on an object that a user has placed in the field of view of the camera. The command information can be printed, written, or drawn on the object. The command information can also be displayed on a display of a portable electronic device, such as a mobile phone, a tablet or laptop computer, a personal digital assistant, or other electronic device capable displaying content on the display screen. The user can place the display of the device in the field of the view of the video camera 105 oriented so that the display faces the lens 350.

The video camera 105 can include an infrared port or other sensor that is separate from the imaging sensor 350 that can be used to detect command information from a user. The video camera 105 can be configured to allow the user to communicate with the video camera 105 using infrared or other electromagnetic frequencies outside of the portion of the electromagnetic spectrum that is typically visible to humans. Command information that is transmitted to the video camera 105 using a portion of the electromagnetic spectrum that is outside of the portion of the spectrum that is visible to humans is still referred to herein as "visual" command information even though they may be outside of the portion of the electromagnetic spectrum that is normally visible to humans.

The command information is analyzed to identify commands included in the command information (stage 430). The command processing module 328 can recognize commands encoded in one or more ways. For example, the command information can be printed or handwritten text or can be encoded in a barcode, a QR code, or other type of data matrix or barcode that can be used to encode information into a machine-readable format. The command information can also be encoded using serial data color patterns or matrices of color values, such as HCCB format. Other types of optically readable encoding schemes can also be used. The command information can also be encoded as a series of pulse of infrared or other electromagnetic frequencies that can be detected by the imaging sensor 350 and/or another sensor included in the video camera 105. The command data store 334 can include configuration information that the command processing module 328 can use to determine what command information formats are supported by the video camera 105. Different videos cameras can be configured to support different command information formats.

A determination is made whether the command information includes a valid command (stage 435). The command processing module 328 can compare command information identified at stage 430 with a list of valid commands stored in the command data store 334 to determine whether the identified command is a valid command. If the command information does not match any of the commands listed on the list of valid commands, the command will not be executed by the command processing module 328.

If the identified command information did not include a valid command, the user can be notified that the command received was not valid (stage 440). The command processing module 328 instructs the user interface module 330 to notify the user that an invalid command was received. For example, if the camera includes one or more indicator lights, the user interface module 330 illuminates the one or more indicator lights in a particular color and/or illumination pattern to indicate that the command identified by the video camera 105 was not valid. For example, a particular color and/or illumination pattern can indicate that the camera was unable to parse the command, and another color and/or illumination pattern can indicate that the command identified was not included on the list of commands that the camera is configured to execute.

Notifying the user that the command was not valid can prompt the user to try the command again. The user may simply need to present the command information to the video camera 105 again by repositioning the command information within the camera's field of view. The command information can include contact information for the user, such as a mobile number and/or an email address or the user may have presented authentication credentials to the video camera 105 that included contact information for the user or can be used to lookup contact information for the user.

A determination is made whether the user is authorized to instruct the video camera 105 to execute the requested command (stage 445). The user authentication module 326 can compare authentication credentials presented to the video camera 105 with authentication credentials stored in an authentication data store to determine whether the user is authorized to instruct the video camera 105 to perform the requested command. If the user is not authorized to instruct that the video camera 105 perform the requested command, the video camera 105 can notify the user that the user is not authorized (stage 450). The user interface module 330 of the video camera 105 can notify the user that the user is not authorized to perform the requested command using one or more of the various communication techniques described above, such as sending an email or text message, illuminating one or more indicator lights on the camera device in a particular color and/or illumination pattern. As indicated above, a particular color and/or pattern of illumination can be associated with different responses generated by the camera.

If the command or commands were valid, and the user was authorized to execute the commands, the video camera 105 can execute the command or commands presented to the camera (stage 455). The video camera can set one or more operating parameters of the video camera in response to executing the command. For example, if the visual command was a calibration command, the video camera can set one or more calibration parameters for the video camera. In another example, if the visual command is a video streaming command, the video camera 105 can update an output parameter of the video camera that instructs the video camera to stream the video content captured by the camera to a mobile device of the user issuing the command. The visual command can include an identifier for the user's mobile device, such as a network address or a mobile number to which the video content should be streamed. In yet another example, the visual command can be a configuration output command that causes the video camera to generate a listing of one or more configuration parameters, such as the network address of the device, a unique identifier associated with the hardware of the device, such as a Media Access Control (MAC) address, or other information related to the configuration of the video camera 105.

A command completion indication corresponding to whether the command requested by the user was completes successfully can be determined (stage 460). The command completion indication of the command indicates whether the command completed successfully. Detailed information regarding the completion of the command can also be generated. This information can include details as to why a command could not be completed.

The video camera 105 can be configured to provide the completion status to the user (stage 465). As described above, the user interface module 330 of the video camera 105 can notify the user whether a command completed successfully in a command completion indication using one or more of the communication techniques described above, such as sending an email or text message and/or illuminating one or more indicator lights on the camera device in a particular color and/or illumination pattern. If the method used to replay the information that the command completed can convey a detailed message, details associated with the completion status of the command can be sent to the user. For example, if a command completes successfully, the completion time and/or other information can be sent to the user. If a command fails to be completed, details as to why the command could not be completed can be sent to the user.

Figure 5:
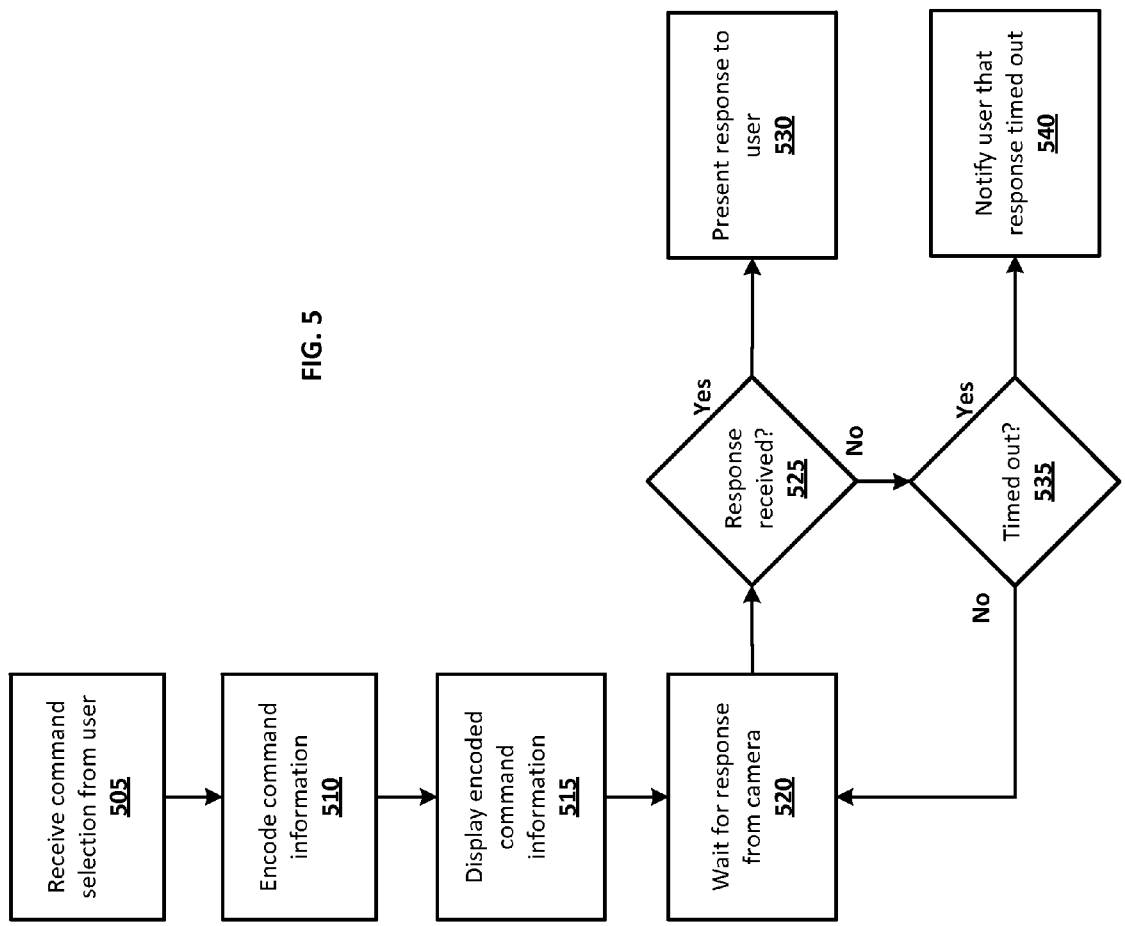
FIG. 5 is a flow diagram of a method of visually communicating with a video camera.

FIG. 5 is a flow diagram of a method for visually communicating with a video camera that can be implemented using the systems illustrated in FIGS. 1-3. The method illustrated in FIG. 5 can be implemented by an electronic device such as a mobile phone, a tablet or laptop computer, a personal digital assistant, or other electronic device capable displaying information on the display screen. Command information for configuring or controlling a video camera 105 can be displayed on the display screen of the electronic device and presented to the video camera 105 by positioning the display of the device in the field of view of the video camera 105. Users are not limited to presenting command information to the video camera 105 using an electronic device as described in the technique illustrated in FIG. 5. As described above, a user can display hard copies of command information to the video camera 105 and receive feedback from the video camera 105 through the various methods described herein.

Returning now to the method illustrated in FIG. 5, the device receives a command selection from the user (stage 505). The device can execute an application that provides a user interface that allows the user to enter commands to be encoded for the video camera 105 and/or allows the user to select from a list of commands recognized by the video camera 105. The application accepts various command parameters associated with the commands from the user as well. For example, the application can be configured to accept login credentials, such as a username and password, which allows a user access to instruct the video camera 105 to perform various commands. The application can accept other commands and command parameters as well.

The device encodes the command information into a format that can be recognized and processed by the video camera 105 (stage 510). The command information can be encoded in various ways. The command processing module 328 of a particular camera may recognize commanded encoded in one or more ways. For example, the command information can be printed or handwritten text or can be encoded in a barcode, a QR code, or other type of data matrix or barcode that can be used to encode information into a machine-readable format. The command information can also be encoded using serial data color patterns or matrices of color values, such as HCCB format. Other types of optically readable encoding schemes can also be used. The command information can also be encoded as a series of pulses of infrared or other electromagnetic frequencies that can be detected by the imaging sensor 350 and/or another sensor included in the video camera 105. The command data store 334 can include configuration information that the command processing module 328 can use to determine what command information formats are supported by the video camera 105. Different videos cameras can be configured to support different command information formats.

The video camera 105 can also recognize handwritten or printed text, and/or drawn or printed symbols that represent command information. For example, the user could draw symbols representing command information, write command information, or type command information on a tablet computer or other portable electronic device and place the screen of the device in the field of view of the video camera 105.

The device can display the encoded command information to the camera (stage 515). The encoded command information can be displayed on a display of the portable electronic device which is position with the display in the field of view of the video camera 105. In some implementations, the device can output hard copies or printouts of the encoded commands, and the user can present the hard copies of the encoded command information to the video camera 105 by placing the information in the field of view of the video camera 105. The user can print out a set of hard copy command cards ahead of time if the user does not wish to bring the device to the location of the video camera 105. For example, the video camera 105 could be installed in a factory or other location with harsh environmental conditions that could damage an electronic device that is not hardened to withstand these conditions. The user can generate hard copies of the commands on a material that can withstand the harsh environmental conditions at the location where the video camera 105 is installed.

In another example, the user device includes an infrared port or other similar interface through which the user device communicates with the video camera 105 via various wavelengths of electromagnetic radiation. The video camera 105 can encode the command information for transmission to the device using the infrared port or other similar interface.

A determination can be made whether a response has been received from the video camera 105 (stage 525). If a response has been received from the video camera 105, the device presents the response to the user (stage 530). For example, the device can be configured to display the response received from the video camera 105 on a display of the device. If the video camera 105 sends an email or a text message in response to the command information presented to the camera, the device can display the email or text message. The video camera 105 can communicate the response to the device via an infrared port or other similar interface and the device can be configured to convert the response received from the video camera 105 into a format that can be displayed to the user. As described above, the video camera 105 can send a request to the video server 120 to send an email or text message or through an email or text messaging server.

If no response has been received from the video camera 105, the device determines whether a predetermined response period has elapsed (stage 535). If the response period has elapsed, the device notifies the user that the video camera 105 failed to respond to the command before the predetermined response period elapsed (stage 540). Otherwise, if the response period has not elapsed, the device can wait for a response to be received from the video camera 105 (stage 520).

Figure 6:
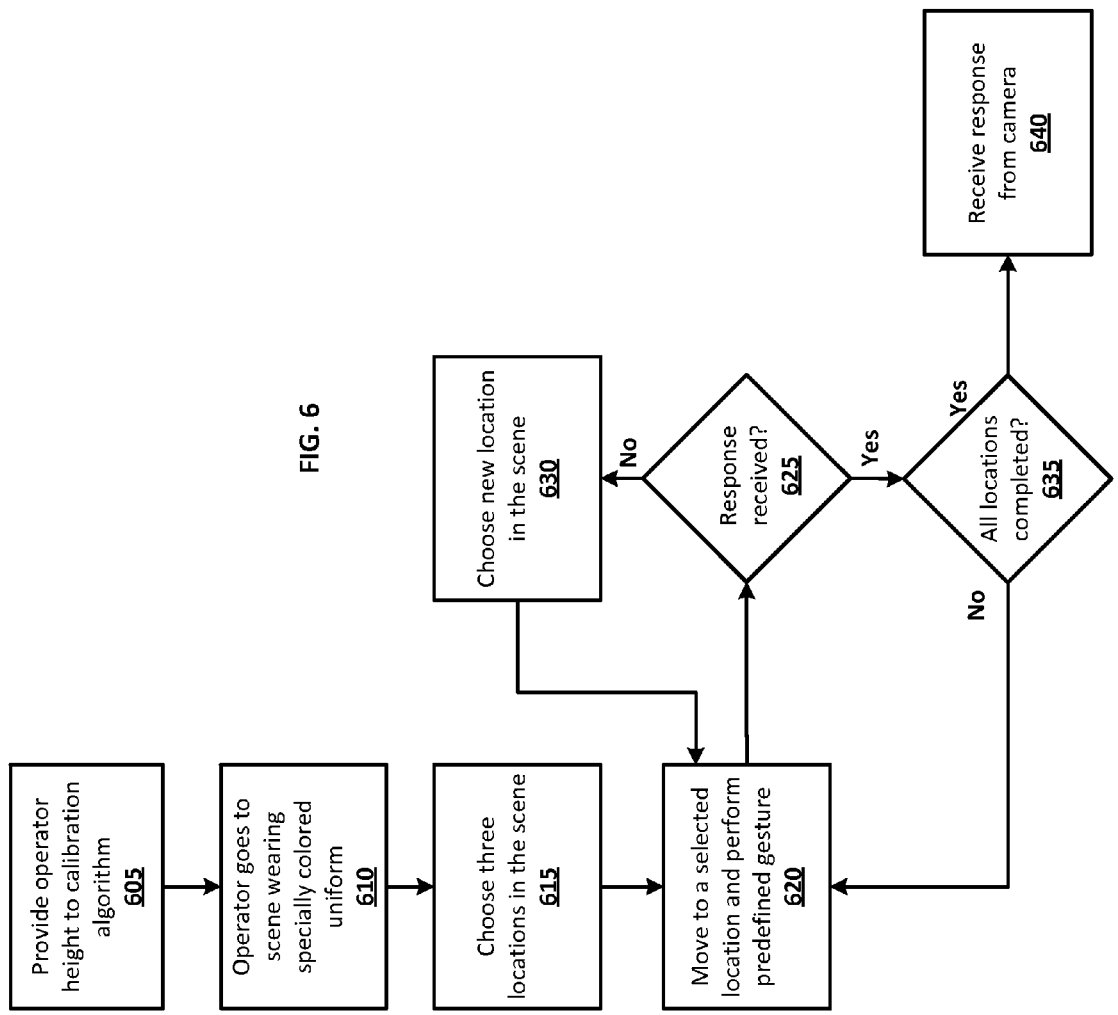
FIG. 6 is a flow diagram of a method of calibrating a video camera using visual commands that can be implemented using the system illustrated in FIG. 1.

FIG. 6 is a flow diagram of a method calibrating a video camera using visual commands that can be implemented using the systems illustrated in FIGS. 1-3. The method illustrated in FIG. 6 uses a video camera 105 that is configured to recognize human gestures and to calibrate the video camera 105 in response to the recognized gestures. While the method illustrated in FIG. 6 is described as being executed by the video processing module 224 of the video server 120 in the examples described below, the method illustrated in FIG. 6 can be implemented by the video processing module 324 of video camera 105 and/or the video processing module 224 of the video server 120.

The camera calibration procedure illustrated in FIG. 6 is performed to map real world coordinates to camera image coordinates. The calibration procedure generates a calibration matrix that can be used to translate camera coordinates to real world coordinates and can be used to determine object size, depth, speed of objects in the scene, or other information based on the video content captured by the camera. Conventional camera calibration techniques require a person to manually mark several positions in the image domain and physical dimensions in the real world domain. The conventional techniques are tedious and require multiple personnel to complete the calibration process.

Once conventional technique for calibrating video cameras uses a Direct Linear Transform to determine the camera calibration matrix. In the DLT approach, a user is required to mark six points in a scene and to measure the coordinates of those points in both the image domain and the real world domain. Once the measurements have been obtained, the twelve standard equations are then must be solved to determine the calibration matrix. This process can be very slow, complicated, and tedious work that requires at least two people to perform. One user must be sent to the scene to make the real-world measurements and the other must access the video server to view the video content received from the video camera to make the image domain measurements.

Another conventional technique for calibrating video cameras requires that a user mark at least two pairs of parallel lines converging at two different points and a line that connects these two points where the parallel lines converge. The line connecting these points is referred to as the vanishing line. A user at the scene's height can then be marked in both real-world coordinates and in image coordinates. A lookup table can then be created based on the collected data. If there is only one vanishing point available in the scene or no parallel lines at all, a person must be sent to the scene while a user marks both the image coordinates and the world coordinates.

The calibration technique described herein is robust, simple, and can be performed by a single user. The user can install the camera at a location to be monitored by the camera and calibrate the camera by communicating the camera through gestures. The user can wear a special uniform that the camera can recognize. For example, the camera can be configured to recognize the uniform if the uniform is a predetermined color or has a predetermined pattern.

The calibration technique disclosed herein overcomes the difficulties presented by conventional calibration techniques. In the calibration technique disclosed herein, the location of a user is determined at three different locations within the scene being monitored. The location of the user is determined by analyzing video content captured by the video camera 105 to identify a trigger color or pattern worn by the user and a trigger gesture made by the user. The position of the user's head and feet can be determined at each location to create three pairs of coordinates that can be used to determine a set of vanishing lines. The height of the user is known. Given the three pairs of coordinates and the known height of the operator, the distance between the vanishing lines can be determined. Using this information, a calibration matrix can be determined that can be used to convert image coordinates for objects observed in the video content to real world coordinates.

The user provides the height of the user to the calibration algorithm (stage 605). The height of the user can be provided to the camera in a number of different ways. For example, in some embodiments, the user can present a visual command to the video camera 105 that is imprinted on physical media or the visual command can be displayed on the display of a mobile device, such as a mobile phone, a tablet computer, or a laptop computer system. The visual command can instruct the video camera to enter the calibration mode and can also provide the user height to the video camera as a command parameter provided with the visual command. Alternatively, the video camera 105 can enter the calibration mode by pressing a button or other control interface on the camera, and the user height can be provided to the video camera as a visual command that is recognized by the video camera upon entering into the calibration mode. For example, the user could write the user height on a piece of paper or other surface and hold the handwritten information in front of the video camera. The user height can also be encoded into a format that can be recognized by the video camera 105 using of the various encoding techniques described above. The video camera 105 can also be connected to video server 120 via the network 115 and the video server 120 can send a command to the video camera 105 to enter into the calibration mode. The video server 120 can also be configured to provide a user interface that can receive the user height from the user.

If the user is not already at the scene being monitored by the video camera 105 to be calibrated, the user then goes to the scene being monitored wearing a specially colored or patterned uniform (stage 610). As described above, the uniform can be a specific color or pattern that is recognized by the video camera 105 for the purposes of calibrating the camera.

The user then chooses three locations in the scene to perform a predetermined gesture recognized by the video analytics algorithms of the surveillance system (stage 615). The three locations selected are preferably a close to the edge of the scene as possible. However, any three locations within the scene can be selected.

The user moves to a selected location wearing a predetermined trigger color, performs a predetermined trigger gesture, and waits for a response to the command (stage 620). The video analytics algorithms of the surveillance system can be configured to identify various gestures. For example, the surveillance system can be configured to recognize the user standing in a "cross" stance with the user's arms extended to the side and held perpendicular to the user's body. The surveillance system can also be configured to recognize other gestures, such as the user crossing his or her arms, the user bending over, or other gesture by the user. Alternatively, the user can move to the first selected location and present the video camera with a visual command recognizable by the surveillance system that indicates that the user is positioned at a selected calibration point.

A determination can then be made whether the user has received a response to the command (stage 625). If the trigger color and gesture are detected in the content captured by the video camera 105, the video analytics algorithms of the surveillance system can generate a text message or email indicating the calibration command has been received and to send the text message or email to a mobile device of the user. The video analytics algorithms of the surveillance system can also provide other types of feedback, such as blinking an indicator light on the video camera to indicate that the calibration command has been received.

If no response is received in response to the color and/or pattern of the uniform and the gesture by the user, the user can select a new location in the scene to perform the command gesture (stage 630). If the video analytics algorithms do not recognize the uniform color/pattern and gesture combination, the user can try an alternate location in the scene to see if the command gesture will be recognized at the alternate location.

If a response is received in response to the color and/or pattern of the uniform and the gesture by the user, a determination can be made whether three locations have been measured (stage 635). If all three locations have not yet been measured, a response can be provided to the user indicating that the calibration process is completed. For example, a text message or email message can be sent to the user to notify the user that the information needed to calibrate the camera has been obtained. An indicator light on the video camera 105 can also be illuminated to indicate that the calibration information has been obtained. Otherwise, if information for additional locations needs to be collected, the user can move to the next selected location and perform a predefined gesture (stage 620).

Figure 7:
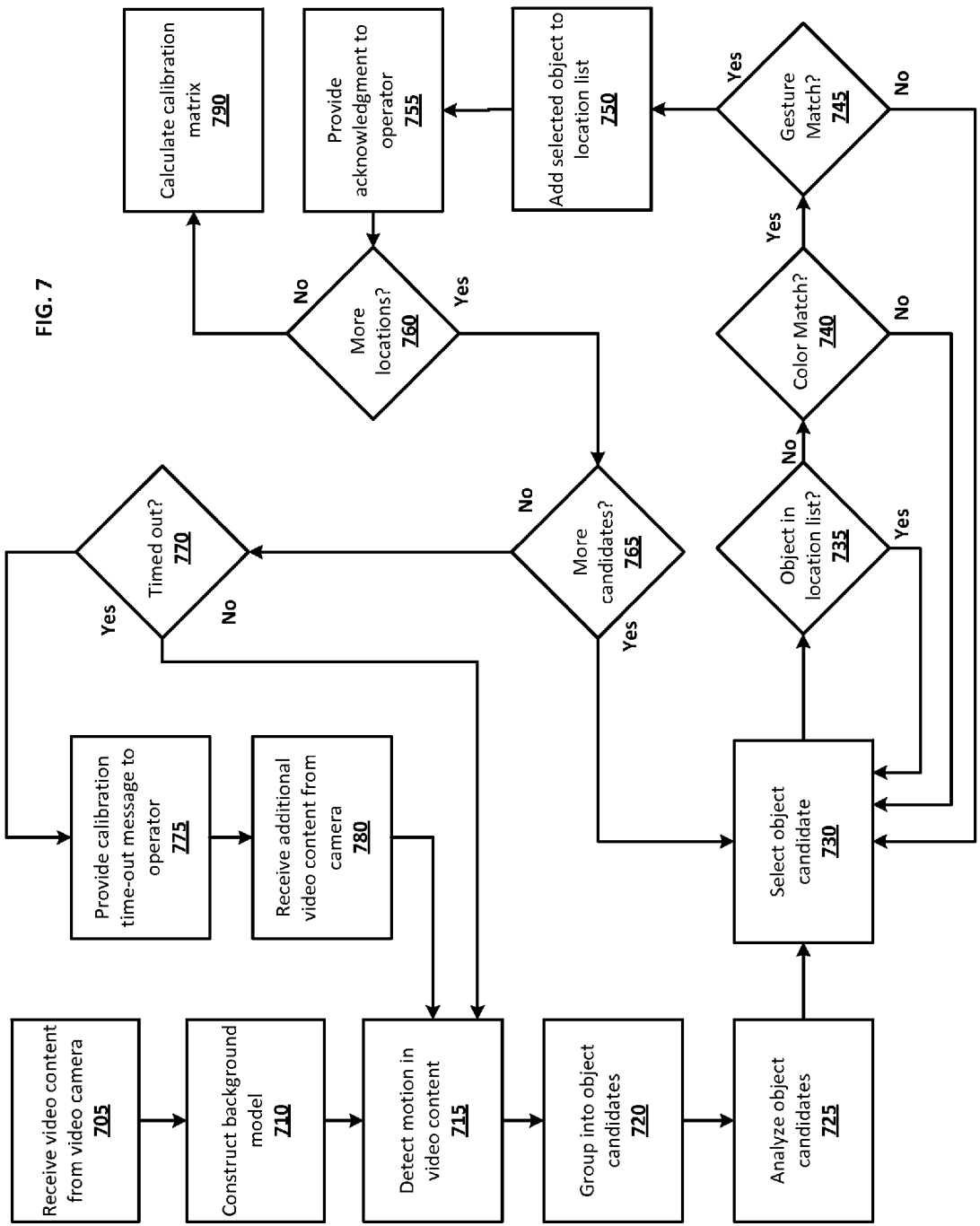
FIG. 7 is a flow diagram of a method for calibrating a video camera using gestures.

FIG. 7 is a flow diagram of a method for calibrating a video camera using gestures. The method illustrated in FIG. 7 can be implemented by the surveillance system illustrated in FIGS. 1-3 to calibrate a video camera using gestures. The method illustrated in FIG. 7 can be implemented to response to a user presenting calibration commands to a video camera 105, such as in the method illustrated in FIG. 6.

The method illustrated in FIG. 7 can be implemented in the video server 120. Alternatively, the video camera 105 can be configured to perform some or all of the calibration steps of the method. While the method described in FIG. 7 described the use of gestures to convey calibration commands to the video camera 105, gestures can also be used to convey other types of commands to the video camera.

Video content is received from the video camera 105 (stage 705). The video camera 105 can be instructed to begin capturing video content. The video camera 105 begins capturing video content when the video camera 105 is powered up. Alternatively, the video camera 105 can also be configured to include a button or other control that, when activated, causes the video camera 105 to begin capturing video content. The video camera can perform various startup procedures, such as initializing a location list. The location list stores location data that can be used to determine the calibration matrix for the video camera 105.

A background model can be constructed by processing the video content provided by the video camera 105 (stage 710). The video processing module 224 of the video server 120 can process the video content received from the video camera 105 to identify what comprises the background of the scene. The background model can be used to distinguish from background objects in a scene and foreground objects that may be of interest.

Motion in the video content can be identified for further analysis (stage 710). The video processing module 224 can identify motion in the video content. Motion in the video content can indicate that an object of interest has entered the foreground of the scene. For example, a user may have entered the field of view of the camera and to provide gesture commands to the video camera 105. The video processing module 224 can subtract the background from the video content received from the video camera 105 to identify moving foreground objects in the video content. The video processing module 224 can be configured to associate different commands with different combinations of trigger colors worn by a user and trigger gestures made by the user. The video processing module 224 can also be configured to recognize different patterns as well as colors.

The detected motion can then be grouped into object candidates (stage 720). The video processing module 224 can group objects proximate to one another into single larger objects if the objects are within a certain distance from one another. Neighboring pixels can be grouped together to form an object using a region growing algorithm. Neighboring objects can be grouped together if the objects are closer than a predetermined threshold distance from one another. Object distance can be calculated using an object pixel dilation method. For each object, the size of the object can be expanded by one pixel at a time. If, after the expanding the objects 'n' times (where n is an integer value), the distance between the objects determined to be n and if n is less than the predetermined threshold distance, the two objects can be grouped together.

The candidate objects from stage 720 can then be analyzed (stage 725). The video processing module 224 can analyze the objects to determine whether any of the object is a user wearing a trigger color and performing a trigger gesture. The video processing module 224 can analyze the colors of the detected objects to determine whether the objects are a trigger color that is associated with a command. The video processing module 224 can also analyze the shape of the objects and the motion of the objects to determine whether the objects match a trigger gesture associated with a calibration command. The object can also be analyzed to determine an estimated position of the head and feet of the user (if the object is indeed the user). Since the user's height remains constant, this known variable can be used to solve for other unknown values. The positions of the head and feet provide a pair of coordinates that can be used to calculate vanishing lines. The vanishing lines, along with the user's height, can be used to construct a lookup table that can be used to translate from image coordinates to real world coordinates. The lookup table can be used to determine the height, size, and depth of objects in the scene, as long as the object being analyzed makes contact with the ground.

The video processing module 224 can then select a candidate object from the objects identified (stage 730). The video processing module can then make a determination whether the selected candidate object has already been added to the location list (stage 735). The location list stores objects have been analyzed and determined to be a user. Once the location list is populated with at least three object location data, the video processing module 224 can use the data collected to generate a lookup table that can be used to translate from image coordinates to world coordinates. If the selected candidate object is already on the location list, the video processing module does not need to consider the selected object again and instead select another candidate object (stage 730).

The video processing module 224 can then make a determination whether the color of the selected candidate object corresponds to a trigger color associated with a calibration instruction (stage 740). The video processing module 224 can recognize trigger colors, and the video processing module 224 can associate certain trigger colors with specific commands and associate other trigger colors with other commands. If the color of the selected candidate object does not match a trigger color associated with calibration instructions, the selected candidate object is discounted as being a user and the video processing module 224 can select another candidate object. Otherwise, if the color of the object matches a trigger color, a determination can be made whether the object shape corresponds to a trigger gesture (stage 745).

If object shape did not match the trigger gesture, the selected object can be discarded and another candidate object can be selected (stage 730). The color of the selected object matched a trigger color, but the trigger gesture associated with the command was not identified. This could occur if an object that matches the trigger color enters the scene, or of the user enters the scene wearing a trigger color enters the scene but does not perform a trigger gesture. The skeleton of the selected object can be extracted and compared to the trigger gesture using various gesture recognition methods.

If the trigger gesture also matches, the candidate object can be added to the location list (stage 750) and an acknowledgement that the calibration command was recognized (stage 755). The acknowledgement can be provided to the user in various ways. For example, a text message or email message can be sent to the user's mobile device indicating that the calibration command has been recognized. The acknowledgement message can indicate to the user how many locations have been recorded for the calibration command and how many more are required for the calibration calculations. The acknowledgement can also be provided by illuminating an indicator light on the video camera 105 to indicate that the calibration information has been obtained.

A determination can be made whether additional locations are needed to determine the calibration parameters for the video camera 105 (stage 760). If no additional location information is required, the calibration matrix for the camera can be calculated (step 790). Once location information has been acquired for at least three locations, a calibration matrix can be calculate for the video camera 105 that can be used to transform image coordinates to world coordinates.

The position of the user's head and feet can be determined at each location that was captured to create three pairs of coordinates. Since the user's height remains throughout the calibration process, these coordinates can be used to determine a pair of vanishing lines. Since the height of the user is also known, the vanishing lines can be used to create a calibration matrix that can be used to convert image coordinates in the video content captured by the video camera 105 to real world coordinates. The calibration matrix can be used to convert image coordinates in video content received from the video camera 105 to geographical coordinates in the scene being monitored. The calibration matrix can then be used to determine object size, depth, speed of objects in the scene, or other information based on the video content captured by the camera.

If calibration information has not been captured for at least three locations, a determination can be made whether there are additional candidate objects to be processed (stage 765). If there are more candidate objects to be processed, a candidate object can be selected to determine whether the trigger criteria have been satisfied by that object (stage 730). Otherwise, if there a no more candidate objects to be processed, a determination can be made whether the calibration process has timed out (stage 770). The calibration method can include a timeout parameter that can be used to determine how of a period of time the user has to perform the trigger gestures at each of the three selected locations before the process resets. The timeout parameter can also be used to determine how long a period of time can elapse between the user performing a trigger gesture at one location and performing a trigger gesture at the next location. If the user does not perform the trigger gesture at the next location before the predetermined period of time elapses, the calibration process will reset.

If the calibration process has not timed out, the calibration method can continue with stage 715 where motion can be detected in video content received from the video camera 105. Otherwise, if the calibration process has timed out, a time-out message can be provided to the user (stage 775). The time-out message can be provided to the user in various ways. For example, a text message or email message can be sent to the user's mobile device indicating that the calibration process has timed out. The acknowledgement can also be provided by illuminating an indicator light on the video camera 105 to indicate that the calibration process has timed-out. The indicator light can be illuminated in a different color and/or illumination pattern than the acknowledgement message to distinguish the time-out message from the acknowledgement message. The location information that has been collected thus far (if any) can also be discarded. For example, any location data in the location list can be discarded in response to the calibration process timing out. Additional content can then be received from the video camera 105 (stage 780) and the calibration process once again detect motion in the received video content (stage 715).

Figure 8:
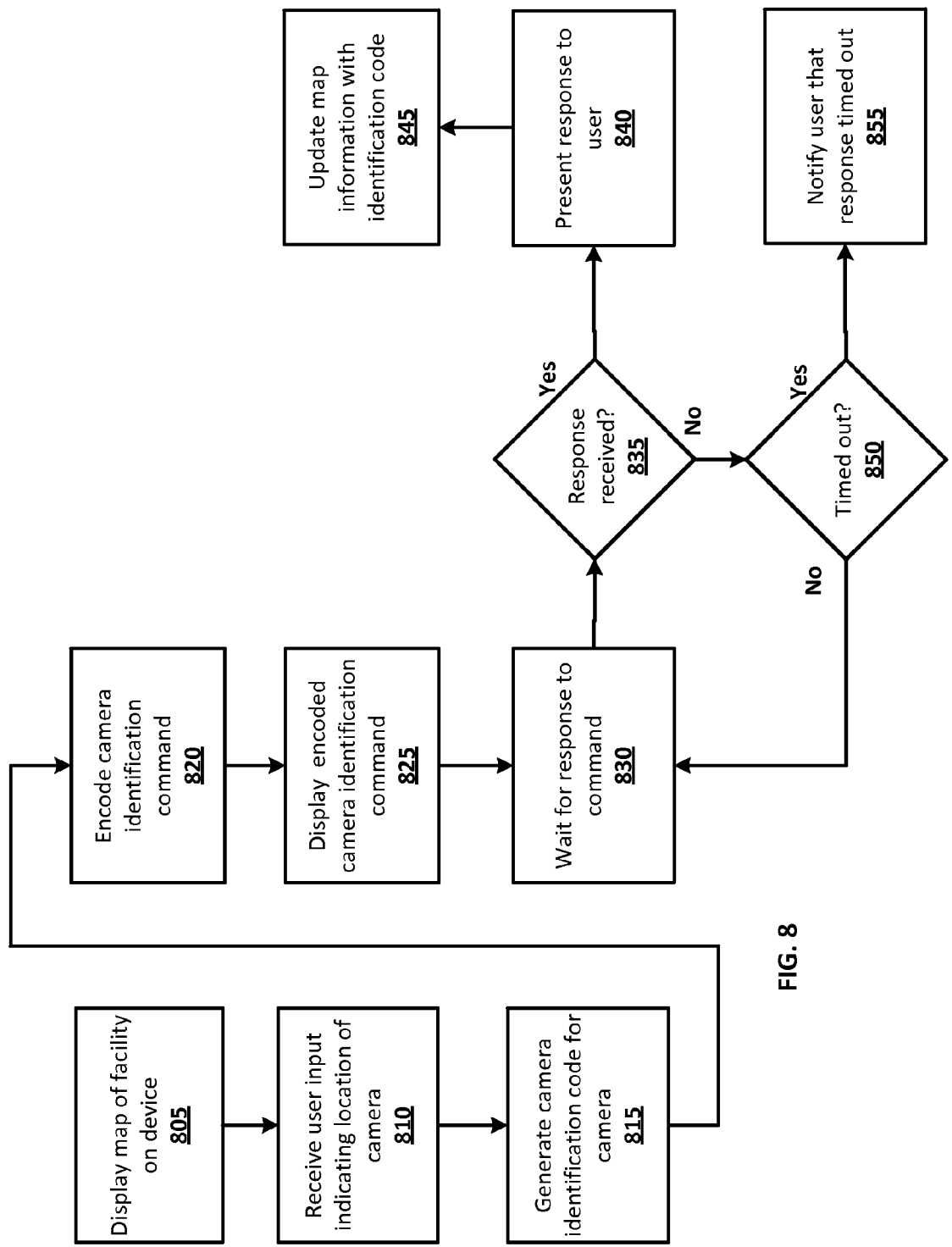
FIG. 8 is a flow diagram of a method for associating video cameras with locations in a facility.

FIG. 8 is a flow diagram of a method for associating video cameras with the cameras' relative locations in a facility. Conventional techniques for identifying the location of cameras within a facility can be a tedious process where content captured by each of the cameras can be viewed and the location of the camera can be manually noted by an user monitoring the video content from the cameras.

The map locations of the video cameras can be used to provide information for commands based on the spatial relationship between the cameras to be understood and processed by the video surveillance system. For example, the video server 120 can include a user interface module that can generate an interface that presents an overlay of the camera locations on the map of the facility that allows a guard to select cameras to view the video content captured by the selected cameras. The user interface can also be configured to allow a guard to enter commands that include a spatial element, such as "display content from camera to the left of the current camera." The user interface module can be configured to convert such spatially-aware elements to identify the selected camera.

In the method illustrated in FIG. 8, a user can load a map of a facility being monitored on a mobile device, such as a mobile phone, a tablet computer, a laptop computer system, or other such device having a processor that can execute processor-executable instructions stored in a tangible, computer-readable memory (stage 805). The mobile device can be configured to send a request to the video server 120 for a copy of the map of the facility and to receive an electronic copy of the map of the facility from the video server 120. The mobile device can be configured to communicate with the video server 120 via network 115 or another network via a wired or wireless connection.

User input indicating a location of a camera can be received by the mobile device (stage 810). The mobile device can include a touch-screen interface that allows a user to add a location of a camera by touching the map. The mobile device can be configured to prompt the user whether the user would like to add a new camera at the selected location. If the user indicates that the user would like to add a new camera to the map at the selected location, a camera identification code can be generated for the camera (stage 815). The camera identification code provides an identifier for the camera that can be used by the video server 120 to identify the camera. The camera identification code can be generated on the mobile device or can be requested from the video server 120, which can be configured to store facility map and camera location information.

The camera identification code can be encoded with a camera identification command into a format that can be recognized and processed by the video camera 105 (stage 820). The camera identification command can also include location information that identifies the location in the facility that the user selected on the map of the facility displayed by the mobile device. The location information can be encoded in different ways. For example, the location information can be represented as X and Y coordinates on a two dimensional grid that can be correlated with coordinates on a 2-D map of the facility. A Z coordinate can be included in the location information for facilities represented by a 3-D map or to represent a floor for multi-story facilities.

As described above, command information can be encoded in various ways. For example, the command information can be encoded in a barcode, a QR code, or other type of data matrix or barcode that can be used to encode information into a machine-readable format. The command information can also be encoded using serial data color patterns or matrices of color values, such as HCCB format. Other types of optically readable encoding schemes can also be used. The command information can also be encoded as a series of pulse of infrared or other electromagnetic frequencies that can be detected by the imaging sensor 350 and/or another sensor included in the video camera 105. Different videos cameras can be configured to support different command information formats.

A visible indication of the encoded camera identification command can then be displayed on a display of the mobile device (stage 825). The mobile device can then be placed in the field of view of the video camera 105 which can then recognize the encoded camera identification command. The video camera 105 can decode the encoded command and send the received camera identification code to the video server 120. The video camera 105 can send additional information to the video analysis server, such as the network address of the camera, which the video server 120 can use to associate the video camera 105 with the camera identification code. The video server 120 can make a determination whether the camera 105 is already associated with a camera identification code. If the camera is not already associated with a video identification code, the video server 120 can update camera location information maintained by the video server 120, and send an acknowledgement that the camera location information has been updated. If the camera is already associated with a video identification code, the video server 120 can be configured to send that code to the mobile device of the user with a message indicating that the camera has already been mapped to that code. If the location of the camera has changed, the user can use the camera identification code associated with the camera to update the camera location information. For example, the mobile device can include an interface that allows the user to update the location of an existing camera.

A determination can be made whether a response to the camera identification command has been received (stage 835). The video camera 105 can acknowledge that the camera identification command has been successfully decoded and executed by the video surveillance system 100. The video server 120 can also send a text message or email message to the user's mobile device in response to the camera identification command.

If a response has been received to the camera identification command, the device can be configured to present the response to the user (stage 840). For example, the device can display the response received on a display of the device. The video camera 105 can send an email or a text message in response to the command information presented to the camera, and the device can display the email or text message. The video camera 105 can communicate the response to the device via an infrared port or other similar interface and the device can convert the response received from the video camera 105 into a format that can be displayed to the user.

If no response has been received from the video camera 105, the device can be configured to determine whether a predetermined response period has elapsed (stage 850). If the response period has elapsed, and the device can be configured to notify the user that the video camera 105 failed to respond to the command before the predetermined response period elapsed (stage 855). Otherwise, if the response period has not elapsed, the device can wait for a response to be received from the video camera 105 (stage 830).

The mobile device can provide a user interface that allows a user to drag and drop an existing camera to a new location on the map. For example, the user may wish to move the location of a camera on the map to more accurately reflect the location of the camera within the facility or to update the map information if a camera is moved to a new physical location within the facility.

Figure 9:
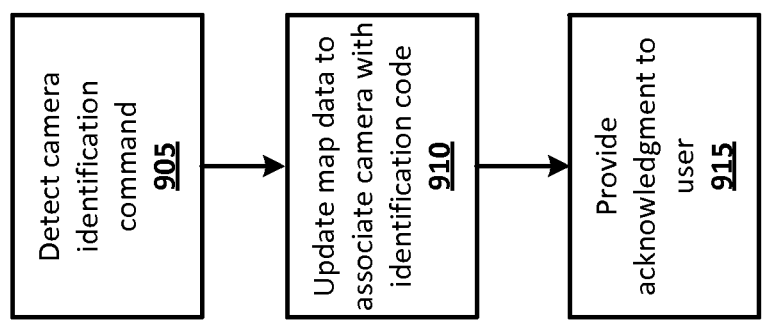
FIG. 9 is a flow diagram of a method for updating camera location information in a video surveillance system.

FIG. 9 is a flow diagram of a method for updating camera location information in a video surveillance system. The method illustrated in FIG. 9 can be implemented by the surveillance system illustrated in FIGS. 1-3. The steps illustrated in FIG. 9 can be implemented by the video camera 105 and the video server 120.

Detect camera identification command (stage 910). The camera identification command can include a unique camera identifier and a camera location. The camera location can be provided as a set of coordinates that correspond to a location in a facility being monitored by the video camera 105. The command processing module 328 of the video camera 105 can detect the camera identification command included in the video content captured by the video camera 105 and can extract the camera identifier and the camera location information from the command. The camera identification command can be encoded using any of the various formats described above. The command processing module can be configured to provide the camera identifier and the camera location information to the video server 120 so that the video server 120 can update the camera location information maintained by the server 120. The video camera 105 can also be configured to provide the video content to the video server 120 without first detecting the camera identification command, and the video server 120 can be configured to detect the camera identification command.

The video server 120 can then update the camera location information maintained by the server using the location information provided with the command (stage 910). The video server 120 can maintain a mapping between camera identifiers and location information for each of the cameras in the facility being monitored. The video server 120 can also map other information that can be used to identify the video cameras 105, such as the network address of the video camera 105, to the unique camera identifier. The mapping maintained by the video server 120 can be used by the video server 120 to determine the spatial relationship between multiple cameras in the facility being monitored. For example, the mapping between camera identification and spatial location of the cameras can be used to allow a user to request information from a x second camera to the left of a first selected camera, and the video server 120 can use the mapping information to identify a camera to the left of the selected camera. The video server 120 can access video content associated collected by the second camera and stream it to the user in response to the command.

The video server 120 can provide an acknowledgement to the user that the map information has been updated (stage 915). For example, the video server 120 can send a text message or an email message to the user's mobile device that can be displayed to the user in response to the user presenting the camera identification command.

The various illustrative logical blocks, modules, and algorithm stages described may be implemented as electronic hardware, computer software, or combinations of both. To clearly illustrate this interchangeability of hardware and software, various illustrative components, blocks, modules, and stages have been described above generally in terms of their functionality. Whether such functionality is implemented as hardware or software depends upon the design constraints imposed on the overall system. The described functionality can be implemented in varying ways. In addition, the grouping of functions within a module, block or stage is for ease of description. Specific functions can be moved from one module or block without departing from the disclosure.

The various illustrative logical blocks and modules described can be implemented or performed with a general purpose processor, a digital signal processor (DSP), application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, multiple microprocessors, one or more microprocessors in conjunction with a DSP core, or any other such configuration.

The operations of a method or algorithm described may be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium. An exemplary storage medium can be coupled to the processor such that the processor can read information from, and write information to, the storage medium. In the alternative, the storage medium can be integral to the processor. The processor and the storage medium can reside in an ASIC.

Various changes and modifications could be made to the descriptions provided above without departing from the scope of the disclosure or the appended claims. For example, although elements may be described or claimed in the singular, the plural may be included. Additionally, all or portions of aspects and/or embodiments may be utilized with other aspects and/or embodiments.

What is claimed is:

1. A method for processing visual commands at a video camera, the method comprising:
   analyzing, at the video camera, video content captured by the video camera to identify authentication credentials presented to the camera by a user in the field of view of the camera in the video content captured by the video camera, wherein the video camera is configured to execute a set of visual commands, and wherein the authentication credentials authorize the camera to execute a subset of the set of visual commands associated with the authentication credentials and to prevent the camera from executing visual commands not included in the subset of visual commands associated with the authentication credentials;
   determining, at the video camera, that the user is authorized to send visual commands to the video camera based on the authentication credentials detected;
   analyzing the video content captured by the video camera to identify a visual command presented to the camera by the user in the field of view of the camera;
   executing the visual command identified from the video content captured by the video camera responsive to the visual command being included in the subset of visual commands associated with the authorization credentials, wherein executing the visual command includes setting one or more operating parameters of the video camera, wherein executing the visual command comprises determining whether the visual command comprises a camera identification command, extracting camera identification information and camera location information from the visual command responsive to the visual command comprising a camera identification command, and sending the camera identification information and the camera location information to a security system server responsive to the visual command comprising a camera identification command;
   determining a command completion indication corresponding to whether the command was successfully executed; and
   providing a command completion indication, corresponding to the command completion indication, to the user.

2. The method of claim 1 wherein providing the command completion indication to the user includes sending an email message to the user.

3. The method of claim 1 wherein providing the command completion indication to the user includes sending a text message to the user.

4. The method of claim 1 wherein providing the command completion indication to the user includes illuminating one or more indicator lights on the video camera in a predetermined pattern.

5. The method of claim 1 wherein analyzing the video content includes interpreting a barcode.

6. The method of claim 1 wherein analyzing the video content includes interpreting a two-dimensional data matrix.

7. The method of claim 1 wherein analyzing the video content includes interpreting a color pattern.

8. The method of claim 1 wherein analyzing the video content includes interpreting icons.

9. The method of claim 1 wherein executing the visual command identified in the video content captured by the video camera further comprises:
   transmitting the video content captured by the video camera to a mobile device associated with the user.

10. The method of claim 1, wherein analyzing the video content captured by the video camera comprises performing a geometric correction on the video content to correct for distortions in the visual command.

11. The method of claim 1, wherein the visual command comprises information presented to the video camera in a portion of an electromagnetic spectrum that is outside a portion of the electromagnetic spectrum visible to the human eye.

12. The method of claim 1 wherein the visual command comprises a command to test integration of a component of a security system with the security system, and wherein executing the visual command includes sending a signal to the component of the security system to trigger the component of the security system to perform an action.

13. The method of claim 12 wherein the component of the security system comprises an alarm or a security door.

14. A video camera configured to receive and processing visual commands, the video camera comprising:
   means for analyzing, at the video camera, video content captured by the video camera to identify authentication credentials presented to the camera by a user in the field of view of the camera in the video content captured by the video camera, wherein the video camera is configured to execute a set of visual commands, and wherein the authentication credentials authorize the camera to execute a subset of the set of visual commands associated with the authentication credentials and to prevent the camera from executing visual commands not included in the subset of visual commands associated with the authentication credentials;
   means for determining, at the video camera, that the user is authorized to send visual commands to the video camera based on the authentication credentials detected;
   means for analyzing the video content captured by the video camera to identify a visual command presented to the camera by the user in the field of view of the camera;
   means for executing the visual command identified from the video content captured by the video camera responsive to the visual command being included in the subset of visual commands associated with the authorization credentials, wherein executing the visual command includes setting one or more operating parameters of the video camera, wherein the means for executing the visual command comprises means for determining whether the visual command comprises a camera identification command, and means for extracting camera identification information and camera location information from the visual command responsive to the visual command comprising a camera identification command, and means for sending the camera identification information and the camera location information to a security system server responsive to the visual command comprising a camera identification command;

means for determining a command completion indication corresponding to whether the command was successfully executed; and means for providing a command completion indication, corresponding to the command completion indication, to the user.

15. The video camera of claim 14 wherein the means for providing the command completion indication to the user includes means for sending an email message to the user that includes the command completion indication.

16. The video camera of claim 14 wherein the means for providing the command completion indication to the user includes means for sending a text message to the user that includes the command completion indication.

17. The video camera of claim 14 wherein the means for providing the command completion indication to the user includes means for illuminating one or more indicator lights on the video camera in a predetermined pattern.

18. The video camera of claim 14 wherein the means for analyzing the video content includes means for interpreting a barcode.

19. The video camera of claim 14 wherein the means for analyzing the video content includes means for interpreting a two-dimensional data matrix.

20. The video camera of claim 14 wherein the means for analyzing the video content includes means for interpreting a color pattern.

21. The video camera of claim 14 wherein the means for analyzing the video content includes means for interpreting icons.

22. The video camera of claim 14 wherein the means for executing the visual command identified in the video content captured by the video camera further comprises:

means for transmitting the video content captured by the video camera to a mobile device associated with the user.

23. A tangible computer-readable medium, having stored thereon computer-readable instructions for processing visual commands received at a video camera, comprising instructions configured to cause a computer to:

analyze, at the video camera, video content captured by the video camera to identify authentication credentials presented to the camera by a user in the field of view of the camera in the video content captured by the video camera, wherein the video camera is configured to execute a set of visual commands, and wherein the authentication credentials authorize the camera to execute a subset of the set of visual commands associated with the authentication credentials and to prevent the camera from executing visual commands not included in the subset of visual commands associated with the authentication credentials;

determine, at the video camera, that the user is authorized to send visual commands to the video camera based on the authentication credentials detected;

analyze the video content captured by the video camera to identify a visual command presented to the camera by the user in the field of view of the camera;

execute the visual command identified in the video content captured by the video camera responsive to the visual command being included in the subset of visual commands associated with the authorization credentials, wherein executing the visual command includes setting one or more operating parameters of the video camera in response to identifying the visual command, wherein the instructions configured to cause the computer to execute the visual command further comprise instructions configured to cause the computer to determine whether the visual command comprises a camera identification command, to extract camera identification information and camera location information from the visual command responsive to the visual command comprising a camera identification command, and to send the camera identification information and the camera location information to a security system server responsive to the visual command comprising a camera identification command;

generate a command completion indication that indicates whether the command was successfully executed; and provide the command completely status to the user.

24. The medium of claim 23 wherein the instructions that cause the computer to provide the command completion indication to the user includes instructions that cause the computer to send an email message to the user that includes the command completion indication.

25. The medium of claim 23 wherein the instructions that cause the computer to provide the command completion indication to the user include the instructions that cause the computer to send a text message to the user that includes the command completion indication.

26. The medium of claim 23 wherein the instructions that cause the computer to provide the command completion indication to the user includes the instructions that cause the computer to illuminate one or more indicator lights on the video camera in a predetermined pattern.

27. The medium of claim 23 wherein the instructions that cause the computer to analyze the video content includes instructions that cause the computer to interpret a barcode.

28. The medium of claim 23 wherein the instructions that cause the computer to analyze the video content includes instructions that cause the computer to interpret a two-dimensional data matrix.

29. The medium of claim 23 wherein the instructions that cause the computer to analyze the video content includes instructions that cause the computer to interpret a color pattern.

30. The medium of claim 23 wherein the instructions that cause the computer to analyze the video content includes instructions that cause the computer to interpret icons.

31. The medium of claim 23 wherein the instructions that cause the computer to execute the visual command identified in the video content captured by the video camera further comprises instructions to cause the computer to transmit the video content captured by the video camera to a mobile device associated with the user.

32. A video camera comprising:

an imaging sensor configured to output sensor data of view a field of view of the view camera;

a processor configured to execute program instructions to process video data output by the imaging sensor to:

analyze, at the video camera, video content captured by the video camera to identify authentication credentials presented to the camera by a user in the field of view of the camera in the video content captured by the video camera, wherein the video camera is configured to execute a set of visual commands, and wherein the authentication credentials authorize the camera to execute a subset of the set of visual commands associated with the authentication credentials and to prevent the camera from executing visual commands not included in the subset of visual commands associated with the authentication credentials;

determine, at the video camera, that the user is authorized to send visual commands to the video camera based on the authentication credentials detected;

analyze the video content captured by the imaging sensor to identify a visual command presented to the camera by the user in the field of view of the camera;

execute the visual command identified from the video content captured by the video camera responsive to the visual command being included in the subset of visual commands associated with the authorization credentials, wherein executing the visual command includes setting one or more operating parameters of the video camera, wherein the processor is further configured to determine whether the visual command comprises a camera identification command, to extract camera identification information and camera location information from the visual command responsive to the visual command comprising a camera identification command, and to send the camera identification information and the camera location information to a security system server responsive to the visual command comprising a camera identification command;

determining a command completion indication corresponding to whether the command was successfully executed; and provide a command completion indication, corresponding to the command completion indication, to the user.

33. The video camera of claim 32 wherein the processor is configured to send an email message to the user that includes the command completion indication.

34. The video camera of claim 33 wherein the processor is configured to send a text message to the user that includes the command completion indication.

35. The video camera of claim 33 wherein the processor is configured to illuminate one or more indicator lights on the video camera in a predetermined pattern.

36. The video camera of claim 32 wherein the command processing module is configured to interpret commands encoded using a barcode.

37. The video camera of claim 32 wherein the processor is configured to interpret commands encoded using a multi-dimensional data matrix.

38. The video camera of claim 32 wherein the processor is configured to interpret commands encoded using a color encoding technique.

39. The video camera of claim 32 wherein the processor is configured to interpret commands encoded using icons.

40. The video camera of claim 32 wherein the processor is configured to transmit the video content captured by the video camera to a mobile device associated with the user in response to executing the visual command.

* * * * *